(12) United States Patent
Hayashi et al.

(10) Patent No.: US 9,689,443 B2
(45) Date of Patent: Jun. 27, 2017

(54) ELECTRIC PARKING BRAKE DRIVING DEVICE AND ELECTRIC PARKING BRAKE DEVICE

(71) Applicant: ADVICS CO., LTD., Kariya, Aichi-pref. (JP)

(72) Inventors: Yasuhito Hayashi, Nagoya (JP); Yuichi Takeo, Aichi-ken (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 24 days.

(21) Appl. No.: 14/424,378

(22) PCT Filed: Aug. 27, 2013

(86) PCT No.: PCT/JP2013/072908
§ 371 (c)(1),
(2) Date: Feb. 26, 2015

(87) PCT Pub. No.: WO2014/034680
PCT Pub. Date: Mar. 6, 2014

(65) Prior Publication Data
US 2015/0233434 A1   Aug. 20, 2015

(30) Foreign Application Priority Data

Aug. 28, 2012 (JP) ................................. 2012-187270
Mar. 27, 2013 (JP) ................................. 2013-067307

(51) Int. Cl.
*F16D 65/28* (2006.01)
*F16D 65/00* (2006.01)
(Continued)

(52) U.S. Cl.
CPC ......... *F16D 65/0006* (2013.01); *F16D 65/18* (2013.01); *F16D 2121/24* (2013.01); *F16D 2125/40* (2013.01); *F16D 2125/50* (2013.01)

(58) Field of Classification Search
CPC .................................................. F16D 2125/50
See application file for complete search history.

(56) References Cited

U.S. PATENT DOCUMENTS

2011/0315492 A1    12/2011   Sakashita
2013/0203554 A1*   8/2013    Dettenberger .......... F16D 65/28
                                                    475/343

FOREIGN PATENT DOCUMENTS

JP         61-61353 A      4/1986
JP         62-184172 A     11/1987
(Continued)

OTHER PUBLICATIONS

International Search Report (PCT/ISA/210) mailed on Nov. 12, 2013, by the Japanese Patent Office as the International Searching Authority for International Application No. PCT/JP2013/072908.

*Primary Examiner* — Nicholas J Lane
(74) *Attorney, Agent, or Firm* — Buchanan Ingersoll & Rooney PC

(57) ABSTRACT

A parking brake actuator generates and applies a braking force to a vehicle wheel in such a manner that the parking brake actuator converts a rotational motion of a screw member, which is rotated by an electric parking brake driving device, into a translatory motion and transmitting the converted translatory motion to a piston to push a brake pad toward a disc by the piston. The electric parking brake driving device includes an electric motor and a reduction gear mechanism which transmits driving force of the electric motor to the parking brake actuator. The reduction gear mechanism includes a gear body and a planetary gear mechanism, which is provided within the gear body and into which the driving force of the electric motor is inputted. A cushion rubber, which is compressible in the circumferential
(Continued)

direction, is interposed between a ring gear of the planetary gear mechanism and the gear body.

5 Claims, 11 Drawing Sheets

(51) Int. Cl.
*F16D 65/18* (2006.01)
*F16D 121/24* (2012.01)
*F16D 125/40* (2012.01)
*F16D 125/50* (2012.01)

(56) References Cited

FOREIGN PATENT DOCUMENTS

| JP | 2004-129374 A | 4/2004 | |
|---|---|---|---|
| JP | 2008-164111 A | 7/2008 | |
| JP | 2009-168142 A | 7/2009 | |
| JP | 2012-007674 A | 1/2012 | |
| WO | WO 2012010256 A1 * | 1/2012 | ............. F16D 65/28 |

* cited by examiner

ELECTRIC PARKING BRAKE DRIVING DEVICE AND ELECTRIC PARKING BRAKE DEVICE

TECHNICAL FIELD

This invention relates to an electric parking brake driving device and an electric parking brake device, which are actuated by an electric motor in order to apply braking force to a vehicle wheel upon parking a vehicle.

BACKGROUND ART

There has been a known technology (for example, see patent document 1) relating to a motor speed reduction device, which reduces the speed of driving force from an electric motor and outputs the reduced driving force. According to the known motor speed reduction device, rotational force inputted from an outer-rotor-type electric motor is reduced by means of a reduction gear mechanism having a planetary gear mechanism. According to the motor speed reduction device of the known technology, an amount of projection of the electric motor in a radial direction is reduced and the size of the electric motor in a rotation axis direction is also reduced.

CITATION LIST

Patent Literature

Patent Document 1: JP2004-129374 A

SUMMARY OF INVENTION

Technical Problem(s)

Conventionally, it has been considered to use the above-mentioned motor speed reduction device to an electric parking brake driving device, which actuates an electric parking brake device. Such electric parking brake device is configured so that the driving force of the electric motor is transmitted to a screw by the reduction gear mechanism. A rotary motion of the screw is converted into a translatory motion by means of a nut member, which is formed not to be rotatable, and the converted translatory motion is transmitted to a caliper piston. A brake pad, which is biased by the caliper piston, pushes a disc that unitary rotates with a vehicle wheel, thereby generating braking force at the vehicle wheel.

According to the electric parking brake driving device, the reversed efficiency at a meshed portion between the screw and the nut member is often set to be zero (0) or lower in order to maintain the braking force applied to the vehicle wheel. Therefore, even when the electric motor and the reduction gear mechanism are turned to be in a return state upon release of a parking brake operation after the parking brake operation is conducted, the screw and the nut member are kept engaged (self-locked) and some time the screw may not rotate in a returning direction. Hence, in this case, axial force of the nut member is kept high immediately after the release of the parking brake operation (see line P in FIG. 12A), and a clearance is formed between gear members within the reduction gear mechanism due to a backlash and the like.

Subsequently, when the locked state established between the screw and the nut member is released after a predetermined period of time has elapsed and the screw starts rotating in the returning direction, accumulated elastic energy is released all at once and the clearance formed in the reduction gear mechanism is closed, as a result, a load suddenly starts to be applied to the gear members (see line Q in FIG. 12B). The sudden increase of the load is transmitted to the electric motor as an impact, which generates a rattle sound (an impact sound) (see line R in FIG. 12C) or a vibration within the reduction gear mechanism. The impact sound and the vibration may resonate on a vehicle, by which a passenger may feel serious discomfort.

The present invention was made in consideration with the above-mentioned situation and an object of the invention is to provide an electric parking brake driving device and an electric parking brake device, which are configured to reduce the impact sound generated upon release of the braking brake operation.

Solution to Problem(s)

The structure of the invention is characterized in that the electric parking brake driving device for driving a parking brake actuator which generates a braking force and applies the braking force to a vehicle wheel in such a manner that the parking brake actuator converts a rotational motion from a rotating member into a translatory motion, transmits the converted translatory motion to a piston and pushes a disk rotated together with the vehicle wheel by means of a brake pad biased by the piston, the electric parking brake driving device includes an electric motor, and a reduction gear mechanism for transmitting a driving force of the electric motor to the rotating member, wherein the reduction gear mechanism includes a housing, a sun gear provided within the housing and receiving the driving force of the electric motor, a plurality of planetary gears engaged with the sun gear and rotating along an outer circumference of the sun gear in accordance with rotation of the sun gear, a ring gear arranged to surround the planetary gears, engaged with the planetary gears at an inner peripheral surface of the ring gear, and attached to the housing, and a carrier member connecting the plurality of planetary gears with one another, connected to the rotating member, rotated in accordance with rotation of the planetary gears thereby reducing a rotation speed of the sun gear, and outputting the rotation with reduced speed to the rotating member, wherein an elastic member, which generates an elastic force in a circumferential direction in accordance with rotation of the ring gear relative to the housing, is provided between the ring gear and the housing, wherein the elastic member is formed to be compressible in the circumferential direction in accordance with the rotation of the ring gear relative to the housing upon lease of a parking brake operation and is formed to have a clearance equal to or more than zero (0) in the circumferential direction relative to the ring gear and the housing while in a process of the parking brake operation.

In an embodiment of electric parking brake driving device, the elastic member includes a tightening allowance in an axial direction of the ring gear relative to the ring gear and the housing.

In an embodiment of the electric parking brake driving device, the elastic member includes a tightening allowance in a radial direction relative to the ring gear and the housing.

In an embodiment of the electric parking brake driving device, the elastic member includes an outer-side portion and an inner-side portion, which face each other, a connecting portion connecting the outer-side portion and the inner-side portion, and a space formed between the outer-side portion and the inner-side portion, and the elastic member is interposed and retained between the housing and the ring gear in such a manner that the outer-side portion contacts an inner peripheral surface of the housing, the inner-side portion contacts an outer peripheral surface of the ring gear, and the outer-side portion and the inner-side portion are deformed to compress the space so that the outer-side portion and the inner-side portion are located closer to each other in the radial direction under the state that the elastic member has a restoring force.

In an embodiment of the electric parking brake driving device, the ring gear is formed to be insertable onto the inner peripheral surface of the housing; the housing includes an accommodating surface, which extends from an outer wall of the housing in the radial direction toward the center of the ring gear and which faces an axially end surface of the ring gear located at a position opposite to the parking brake actuator; the inner peripheral surface of the housing is formed with a lock-side torque receiver and a release-side torque receiver, which project in a radially inward direction toward the outer peripheral surface of the ring gear and which are distanced away from one another by a predetermined distance in the circumferential direction, and an engagement wall, which projects in the radially inward direction at a location other than an interval between the lock-side torque receiver and the release-side torque receiver and which extends in the circumferential direction at a location distanced away from the accommodating surface by a predetermined distance in the axial direction; the outer peripheral surface of the ring gear is formed with a stopper portion, which projects in a radially outward direction and whose width in the circumferential direction is smaller than the interval between the lock-side torque receiver and the release-side torque receiver, and a detachment prevention portion, which projects in the radially outward direction at a location distanced away from the stopper portion in the circumferential direction and whose width in the axial direction is smaller than a clearance between the accommodating surface and the engagement wall; and the ring gear is attached to the housing in such a manner that the ring gear is inserted relative to the housing in the axial direction while the stopper portion is located at a position between the lock-side torque receiver and the release-side torque receiver in the circumferential direction and the detachment prevention portion is located at a position avoiding the engagement wall in the circumferential direction, then, the ring gear is rotated in the circumferential direction so that the stopper portion is moved closer to the lock-side torque receiver until the stopper portion is positioned between the accommodating surface and the engagement wall, and thereafter the elastic member is inserted in the axial direction into a clearance formed between the stopper portion and the release-side torque receiver in the circumferential direction.

In an embodiment of the electric parking brake driving device the outer peripheral surface of the ring gear is formed with a retaining portion projecting in the radially outward direction, the retaining portion faces an axially end portion of the elastic member, which does not face the accommodating surface, while the ring gear is attached on the housing, and the elastic member is insertable in the axial direction while passing over the retaining portion.

In an embodiment of the electric parking brake driving device, elastic member includes a base portion, whose thickness in the radial direction while the elastic member is inserted between the housing and the ring gear is equal to or smaller than a clearance formed between the retaining portion of the ring gear and the inner peripheral surface of the housing, and a holding rib, which is provided at a rear end portion of the base portion in an insertion direction of the elastic member to be inserted between the housing and the ring gear and which projects toward the outer peripheral surface of the ring gear, and the thickness of the elastic member at a portion, where the holding rib is formed, in the radial direction is greater than the clearance formed between the retaining portion of the ring gear and the inner peripheral surface of the housing.

In an embodiment of the electric parking brake driving device, the reduction gear mechanism includes: a drive gear provided within the housing and fixed on an output shaft of the electric motor; a first rotating shaft rotatably supported relative to the housing; a first driven gear formed on the first rotating shaft, having a greater number of teeth than the drive gear, and engaged with the drive gear, so that the rotation speed of the electric motor is reduced and the rotation with the reduced speed is transmitted to the first rotating shaft; a transmitting gear provided on the first rotating shaft and rotating unitary with the first driven gear; a second rotating shaft rotatably supported relative to the housing; and a second driven gear provided on the second rotating shaft, having a greater number of teeth than the transmitting gear, and engaged with the transmitting gear, wherein the sun gear is formed on the second rotating shaft so that the sun gear rotates unitary with the second driven gear.

Advantageous Effects of Invention

In an embodiment of the electric parking brake driving device, the elastic member, which generates the elastic force in the circumferential direction in accordance with the rotation of the ring gear relative to the housing, is interposed between the ring gear and the housing of the reduction gear mechanism. As a result, a sudden increase of a load applied to gear members within the reduction gear mechanism upon release of the parking brake operation may be avoided, thereby an impact sound to be generated within the reduction gear mechanism may be reduced. Further, according to the electric parking brake driving device associated with claim 2, the elastic member is formed to be compressible in the circumferential direction in accordance with the rotation of the ring gear relative to the housing upon lease of the parking brake operation and is formed to have the clearance equal to or more than zero (0) in the circumferential direction relative to the ring gear and the housing while in a process of the parking brake operation. Hence, a compression load of the elastic member rises from zero (0) when releasing the parking brake operation, so that an absorption range of the load applied to the gear members is enlarged and therefore a load absorption function is enhanced.

In an embodiment of the electric parking brake driving device, the elastic member includes the tightening allowance in the axial direction of the ring gear relative to the ring gear and the housing. Accordingly, the ring gear is retained relative to the housing in the axial direction, so that noise and the like generated by vibration may be reduced.

In an embodiment of the electric parking brake driving device, the elastic member includes the tightening allowance in the radial direction relative to the ring gear and the housing. Accordingly, the ring gear is retained relative to the hosing in the radial direction, so that the noise and the like generated by the vibration may be reduced.

In an embodiment of the electric parking brake driving device, the elastic member is interposed and retained between the housing and the ring gear in such a manner that the outer-side portion contacts the inner peripheral surface of the housing, the inner-side portion contacts the outer peripheral surface of the ring gear, and the outer-side portion and the inner-side portion are deformed to compress the space so that the outer-side portion and the inner-side portion are located closer to each other in the radial direction, while the elastic member has the restoring force. Accordingly, the elastic member is prevented from falling off from the clearance formed between the housing and the ring gear by the restoring force.

Further, the elastic member is easily provided between the housing and the ring gear simply by compressing the space.

In an embodiment of the electric parking brake device, the ring gear is attached to the housing in such a manner that the ring gear is inserted relative to the housing in the axial direction while the stopper portion is located at the position between the lock-side torque receiver and the release-side torque receiver in the circumferential direction and the detachment prevention portion is located at the position avoiding the engagement wall in the circumferential direction, then, the ring gear is rotated in the circumferential direction so that the stopper portion is moved closer to the lock-side torque receiver until the stopper portion is positioned between the accommodating surface and the engagement wall, and thereafter the elastic member is inserted in the axial direction into a clearance formed between the stopper portion and the release-side torque receiver in the circumferential direction.

Accordingly, the ring gear is attached to the housing simply by rotating the ring gear in the circumferential direction, and therefore the ring gear is easily attached to and detached from the housing. Further, the elastic member is easily attached to the housing simply by inserting the elastic member into the clearance formed between the stopper portion and the release-side torque receiver.

In an embodiment of the electric parking brake device, the retaining portion faces the elastic member in the axial direction, thereby the elastic member is prevented from falling off from the clearance formed between the ring gear and the housing. Further, the elastic member is insertable in the axial direction while passing over the retaining portion, so that the elastic member is easily attached to the ring gear.

In an embodiment of the electric parking brake driving device, the elastic member includes the base portion, whose thickness in the radial direction while the elastic member is inserted between the housing and the ring gear is equal to or smaller than the clearance formed between the retaining portion of the ring gear and the inner peripheral surface of the housing, and the holding rib, which is provided at the rear end portion of the base portion in an insertion direction of the elastic member to be inserted between the housing and the ring gear and which projects toward the outer peripheral surface of the ring gear, wherein the thickness of the elastic member at the portion, where the holding rib is formed, in the radial direction is greater than the clearance formed between the retaining portion of the ring gear and the inner peripheral surface of the housing. Accordingly, the elastic member is easily inserted between the housing and the ring gear simply by deforming the elastic member and the holding member passing over the retaining portion.

Further, because the holding rib contacts the retaining portion after the elastic member is inserted between the housing and the ring gear, the elastic member is surely prevented from falling off from the clearance formed between the ring gear and the housing.

In an embodiment of the electric parking brake device, the housing includes therein the drive gear fixed on the output shaft of the electric motor, the first rotating shaft rotatably supported relative to the housing, the first driven gear formed on the first rotating shaft, having a greater number of teeth than the drive gear, and engaged with the drive gear, so that the rotation speed of the electric motor is reduced and the rotation with the reduced speed is transmitted to the first rotating shaft, the transmitting gear provided on the first rotating shaft and rotating unitary with the first driven gear, the second rotating shaft rotatably supported relative to the housing, the second driven gear provided on the second rotating shaft, having a greater number of teeth than the transmitting gear, and engaged with the transmitting gear, and the sun gear formed on the second rotating shaft so that the sun gear rotates unitary with the second driven gear. Accordingly, the rotation of the electric motor is reduced by the three-stage reduction gear mechanism. Hence, driving torque acting on the rotating member is increased and therefore the braking force applied to the vehicle wheel is increased.

BRIEF EXPLANATION OF ATTACHED DRAWINGS

EMBODIMENTS FOR IMPLEMENTING INVENTION

[First Embodiment]

An electric parking brake device P according to the first embodiment of the invention will be explained below with reference to FIGS. 1 through 6. In the following explanation, a state in which electric power is supplied to an electric motor 3 in order to apply braking force to a vehicle wheel W is referred to as a parking brake operation, a state in which the electric motor 3 is actuated in a direction reverse to the case of the parking brake operation in order to start cancelling the braking force to be applied to the vehicle wheel W is referred to as a release of the parking brake operation, and a state in which the electric power is not supplied to the electric motor and the braking force is not generated at the vehicle wheel W is referred to as a non-operation of a parking brake.

Figure 1:
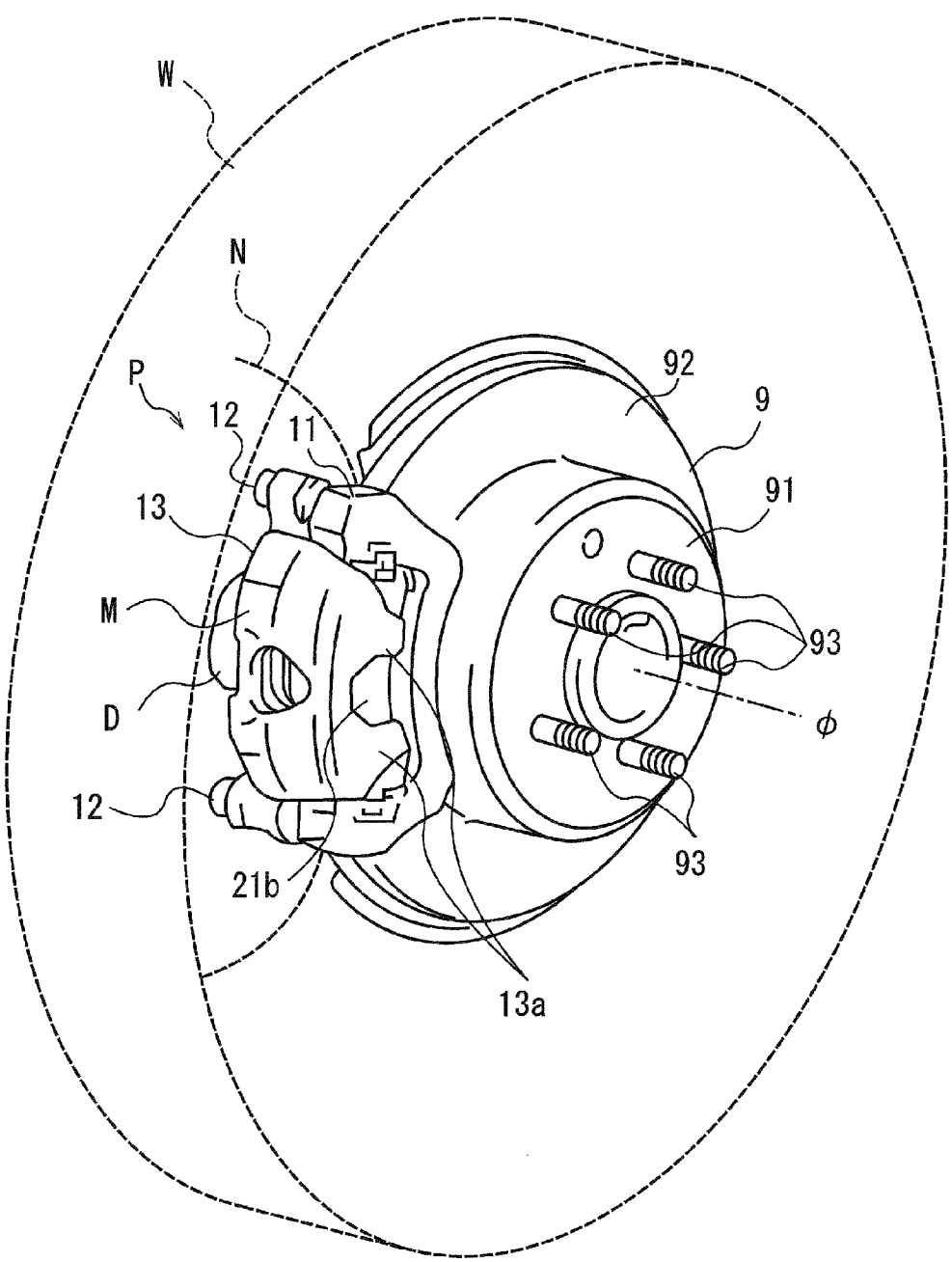
FIG. 1 is an outer perspective view of an electric parking brake device according to a first embodiment of the invention showing a state in which the electric parking brake device is attached to a disc rotor.

A disc rotor 9 (which corresponds to a disc), which is not a structural element of the invention, includes a hat portion 91 projecting to the outside of a vehicle from the rotation center thereof and a plate portion 92 formed around the periphery of the hat portion 91 and is squeezed by a first brake pad 21a and a second brake pad 21b, whose operation will be explained below. As shown in FIG. 1, a plurality of stud bolts 93 projects from an end surface of the hat portion 91. The disc rotor 9 is attached to a disc wheel (not shown) of the vehicle wheel W by means of the stud bolts 93, so that the disc rotor 9 is unitary rotatable with the vehicle wheel W.

A mounting 11 of the electric parking brake device P is attached and fixed on a knuckle arm N (which corresponds to a vehicle body) of the vehicle. The first and the second brake pads 21a and 21b are supported by the mounting 11 (FIG. 1 shows only the second brake pad 21b). The first brake pad 21a is provided between the disc rotor 9 and a piston 8 which will be explained hereinafter (see FIG. 2).

Figure 2:
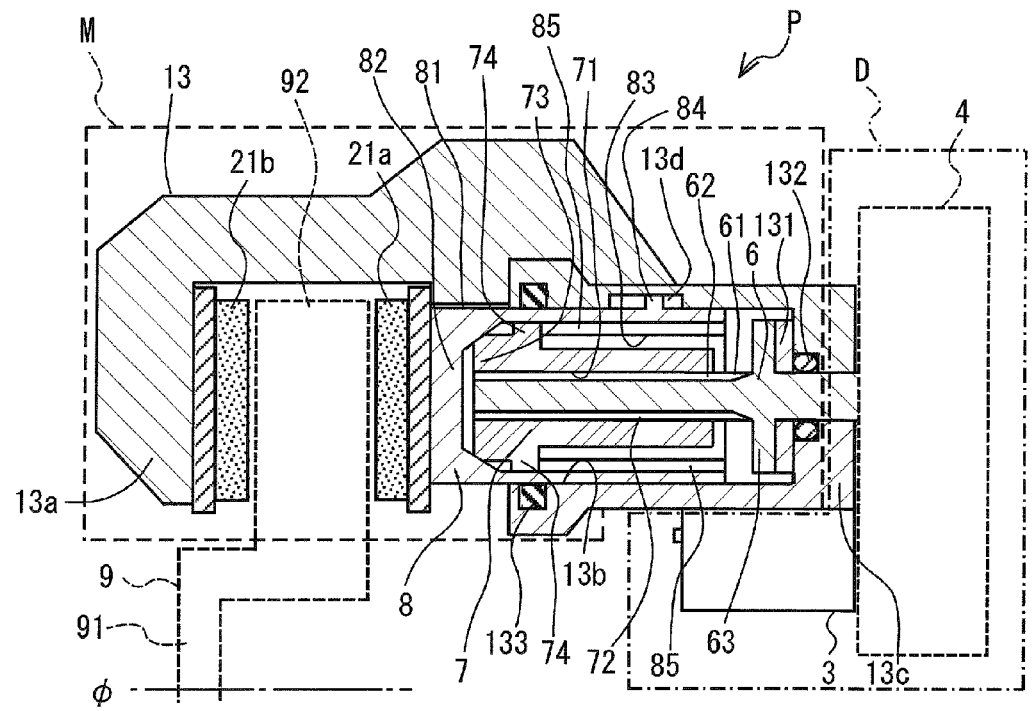
FIG. 2 is a cross sectional view schematically illustrating a parking brake actuator shown in FIG. 1 to be cut in a rotation axis direction of the disc rotor.

A caliper body 13 (whose structure including a gear body 41 to be explained later corresponds to a housing) is attached on the mounting 11 by means of a pair of slide pins 12 while being allowed to be movable in a rotation axis φ direction of the disc rotor 9. The caliper body 13 is formed so that a cross section thereof has a substantially reversed C-shape in order to bridge over the plate portion 92 of the disc rotor 9 (see FIGS. 1 and 2). A pair of claw portions 13a for pressing the second brake pad 21b is formed on the caliper body 13. As shown in FIG. 2, an electric parking brake driving device D including the electric motor 3 and a reduction gear mechanism 4 is attached to the caliper body 13. The electric parking brake driving device D will be explained hereinafter.

A cylinder portion 13b is formed inside of the caliper body 13 and a screw member 6 (which corresponds to a rotating member) is provided so as to project into the inside of the cylinder portion 13b. The screw member 6 extends in the rotation axis direction and is rotatably attached to a bottom portion 13c of the cylinder portion 13b through a bearing 131. A sealing member 132, which is formed by a synthetic resin material or a synthetic rubber material, is provided in a clearance formed between an outer peripheral surface 61 of the screw member 6, the bearing 131 and the bottom portion 13c of the cylinder portion 13b. In order to prevent the sealing member 132 and the bearing 131 from moving in the rotation axis direction, a flange portion 63 is formed on the screw member 6.

A nut member 7 (which corresponds to a translatory member) is provided within the cylinder portion 13b so that the nut member 7 is located at a position radially outward of the screw member 6. The nut member 7 is formed in a substantially cylindrical shape and an inner peripheral surface 71 thereof is formed with a female threaded portion 72. The female threaded portion 72 of the nut member 7 is screwed with a male threaded portion 62 formed on the outer peripheral surface 61 of the screw member 6. An end portion 73 of the nut member 7 is formed with a plurality of engagement portions 74 extending from the outer peripheral surface thereof in the radially outward direction.

The aforementioned female threaded portion 72 of the nut member 7 and the male threaded portion 62 of the screw member 6 are formed as for example a trapezoidal screw thread and reversed efficiency between the nut member 7 and the screw member 6 is set to approximately zero (0). Therefore, transmission of movement between the nut member 7 and the screw member 6 is irreversible. More specifically, in the case where a return load is applied to the screw member 6 from the nut member 7 while the braking force is generated, the screw member 6 is not rotated in a direction by which the braking force is cancelled.

The piston 8 is fitted into the cylinder portion 13b while being allowed to be movable in the rotation axis direction of the screw member 6. A piston seal 133 is provided on the cylinder portion 13b so that the piston seal 133 engages with an outer peripheral surface 81 of the piston 8. The piston seal 133, together with the aforementioned sealing member 132, liquid-tightly seal the inside of the cylinder portion 13b from the outside thereof.

The piston 8 is formed in a substantially cylindrical shape whose one end is closed by an end wall 82 and is formed to be in contact with the first brake pad 21*a* with the end wall 82. The aforementioned nut member 7 engages with an inner peripheral surface 83 of the piston 8 while being allowed to be movable relative to the rotation axis direction of the screw member 6. A plurality of projection portions 84 is formed on the outer peripheral surface 81 of the piston 8 and a plurality of slits 13*d* extending in the rotation axis direction of the screw member 6 is formed on the cylinder portion 13*b*. The projection portions 84 of the piston 8 engage with the corresponding slits 13*d*, whereby the rotation of the piston 8 relative to the cylinder portion 13*b* is restricted.

On the other hand, the inner peripheral surface 83 of the piston 8 is provided with a plurality of slide grooves 85 extending in the rotation axis direction of the screw member 6 and the aforementioned engagement portions 74 of the nut member 7 are inserted into the corresponding slide grooves 85. Accordingly, the rotation of the nut member 7 relative to the piston 8 is restricted. Thus, the rotation of the nut member 7 is also restricted relative to the cylinder portion 13*b* via the piston 8.

The screw member 6 is formed to be rotatable by the electric motor 3 through the aforementioned reduction gear mechanism 4. When the screw member 6 is rotated while the vehicle is parked, the non-rotatable nut member 7 is moved within the piston 8 toward the disc rotor 9 in the rotation axis direction of the screw member 6 (to the left as viewed in FIG. 2). Then, the end portion 73 of the nut member 7 pushes the piston 8 and biases the first brake pad 21*a* toward the disc rotor 9.

On the other hand, a reaction force generated at the first brake pad 21*a* acts on the caliper body 13 via the piston 8, the nut member 7, the screw member 6 and the reduction gear mechanism 4 thereby biasing the caliper body 13 in a direction opposing to the piston 8 (to the right as viewed in FIG. 2). Accordingly, the caliper body 13 is moved in the rotation axis direction and the claw portions 13*a* bias the second brake pad 21*b* toward the disc rotor 9. Thus, the disc rotor 9 is squeezed by the first and the second brake pads 21*a* and 21*b*, thereby the braking force is applied to the vehicle wheel W.

In the case of releasing the braking force applied to the disc rotor 9, the electric motor 3 is actuated to be rotated in the reverse direction in order to move the nut member 7 to the right in FIG. 2, thereby the pressing of the first brake pad 21*a* by the piston 8 is stopped. Consequently, the reaction force generated at the first brake pad 21*a* disappears and therefore, the pressing of the second brake pad 21*b* by the claw portions 13*a* of the caliper body 13 is also stopped. As a result, the application of the braking force to the vehicle wheel is stopped.

When a vehicle operator of the vehicle operates a braking operation in order to decelerate the vehicle speed while the vehicle is running, a hydraulic brake pressure discharged from a master cylinder (not shown) is supplied into the cylinder portion 13*b* via a brake conduit (not shown). The hydraulic brake pressure supplied into the cylinder portion 13*b* pushes the piston 8, which has been separated from the nut member 7, in the rotation axis direction of the screw member 6 (to the left in FIG. 2) in order to bias the first brake pad 21*a* toward the disc rotor 9.

The aforementioned mounting 11, the slide pins 12, the caliper body 13, the first brake pad 21*a*, the second brake pad 21*b*, the screw member 6, the nut member 7 and the piston 8 form a parking brake actuator M.

Next, the electric parking brake driving device D (which is hereinafter referred to as a driving device D) for driving the parking brake actuator M will be explained below in detail with reference to FIG. 3. The explanation will be given with the upper side in FIG. 3 as the upper side of the driving device D and the lower side in FIG. 3 as the lower side of the driving device D.

The gear body 41 of the reduction gear mechanism 4 constituting the driving device D includes a lower body 411 and an upper body 412, each of which is integrally formed as one piece by a synthetic resin material. The lower body 411 and the upper body 412 are liquid-tightly joined so that a space having a predetermined volume is formed inside of the unitary connected lower body 411 and the upper body 412. The gear body 41 is fixed on the aforementioned caliper body 13.

Figure 3:
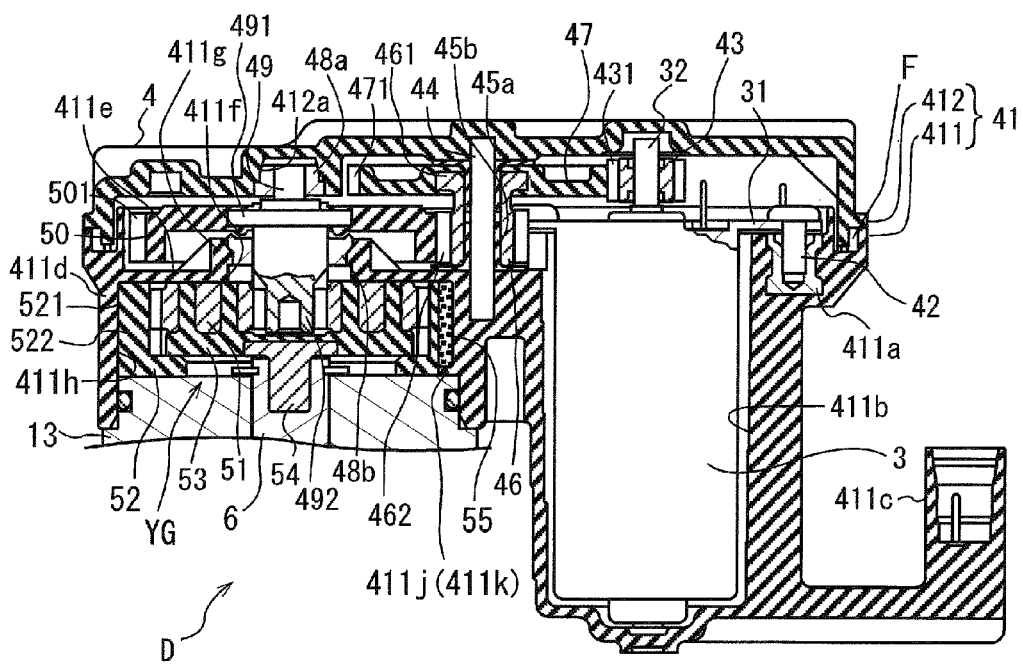
FIG. 3 is a cross sectional view illustrating an electric parking brake driving device shown in FIG. 2 to be cut in an axial direction of a gear member.

As shown in FIG. 3, the electric motor 3 is fixed on the lower body 411 in such a manner that a screw thread 42, which is inserted into a flange portion 31 of the electric motor 3, is tightened on a collar member 411*a*, which is inserted into the lower body 411. The electric motor 3 is accommodated in a motor accommodating portion 411*b*, which is formed to have a shape deeply extending downward inside the lower body 411. The end portion of the lower body 411 is formed with an electric source connector portion 411*c* for connecting an external connector (not shown) therewith. An electric power supply wire (not shown), which connects the electric source connector portion 411*c* with the electric motor 3, is inserted into the lower body 411.

The electric motor 3 is provided with an output shaft 32 (which corresponds to an output shaft), which is arranged parallel to the rotation axis φ of the disc rotor 9. A pinion gear 43 (which corresponds to a drive gear) having helical teeth 431 on the outer peripheral surface thereof is fixed on the output shaft 32 by press-fitting or the like.

A pivot pin 44 is fixed between the lower body 411 and the upper body 412 by, for example, press-fitting, welding or the like. A gear member 46 (which corresponds to a first rotating shaft) is rotatably attached on the pivot pin 44 via a pair of bushes 45*a* and 45*b*. A first flange portion 461 is formed at the upper portion of the gear member 46 so as to project in the radial direction. A first wheel gear 47 (which corresponds to a first driven gear) is fixed on the first flange portion 461 by insert-molding.

The first wheel gear 47 is a helical gear formed by a synthetic resin material and the outer peripheral surface thereof is provided with helical teeth 471. The first wheel gear 47 is engaged with the helical teeth 431 of the aforementioned pinion gear 43. The diameter of the first wheel gear 47 is formed to be larger than the diameter of the pinion gear 43 and the number of the helical teeth 471 of the first wheel gear 47 is formed to be greater than the number of the helical teeth 431 of the pinion gear 43.

A gear portion 462 (which corresponds to a transmitting gear) is integrally formed on the outer peripheral surface of the gear member 46 at the lower portion thereof. The gear portion 462 is provided with the helical teeth and is engaged with a below-mentioned second wheel gear 50 (which corresponds to a second driven gear). An upper bearing member 48*a*, which is made of a metal material, is attached on a recessed portion 412*a* of the upper body 412 by, for example, insert-molding, induction welding or the like.

A bearing fixing surface 411*e* (which corresponds to an accommodating surface) extends from an outer peripheral wall 411*d* (which corresponds to an outer wall) of the lower body 411 in the horizontal direction in FIG. 3. The bearing fixing surface 411*e* extends toward the rotation center of a below-described gear shaft 49 (which corresponds to a second rotating shaft), and separates a planetary gear 51 from the second wheel gear 50.

Figure 4A:
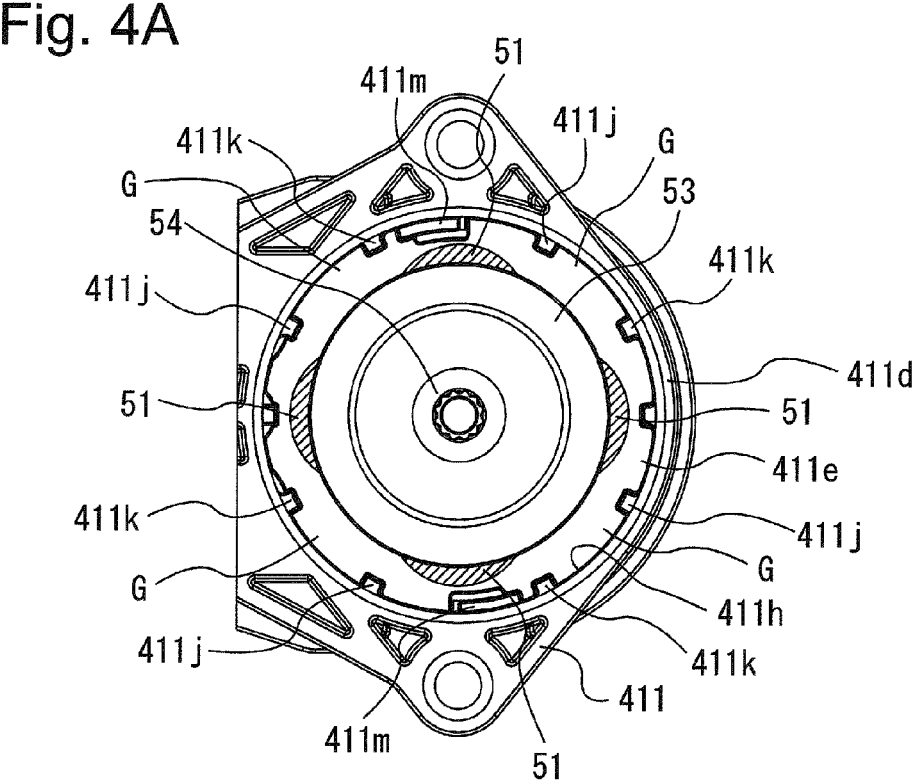
FIG. 4A is a view illustrating a state of a reduction gear mechanism before a ring gear is attached to a gear body being viewed from the parking brake actuator in a rotation axis direction of the sun gear.

The bearing fixing surface 411*e* is formed so that the outer profile thereof has a perfect circular shape (see FIG. 4A). The center of the bearing fixing surface 411*e* is provided with a supporting bore 411*f* penetrating therethrough and is provided with a boss portion 411*g* extending in up-and-down direction. A lower bearing member 48*b* is attached into the boss portion 411*g*. More specifically, the lower bearing member 48*b* is formed by a metal material and is fixed on the boss portion 411*g* by insert-molding, induction welding or the like.

The metal-made gear shaft 49 is rotatably supported on the upper bearing member 48*a* and the lower bearing member 48*b*. The upper portion of the gear shaft 49 is formed with a second flange portion 491, which projects in the radial direction. The second wheel gear 50 is fixed on the second flange portion 491 by insert-molding.

As with the first wheel gear 47, the second wheel gear 50 is a helical gear formed by a synthetic resin material and is provided with helical teeth 501 on the outer peripheral surface thereof. The second wheel gear 50 is engaged with the gear portion 462 of the aforementioned gear member 46. The second wheel gear 50 is formed so that the diameter thereof is larger than the diameter of the gear portion 462 and the number of the helical teeth 501 of the second wheel gear 50 is greater than the number of the teeth of the gear portion 462.

A sun gear portion 492 (which corresponds to a sun gear) is integrally formed at the lower end of the gear shaft 49 as one piece. The sun gear portion 492 is rotated together with the second wheel gear 50.

A plurality of planetary gears 51, which engage with the sun gear portion 492, is arranged around the sun gear portion 492. According to this embodiment, four (4) planetary gears 51 are provided (See FIG. 4A), however the number of the planetary gears is not limited to the number of the planetary gears used in this embodiment. Each of the planetary gears 51 is formed by a metal material and rotates around the outer periphery of the sun gear portion 492 in accordance with the rotation of the sun gear portion 492.

A ring gear 52 formed by a synthetic resin material is arranged around the planetary gears 51. The ring gear 52 in the circular shape is attached on the lower body 411 so that the ring gear 52 engages with each of the planetary gears 51 at the inner peripheral surface thereof and so that the ring gear 52 faces the bearing fixing surface 411*e*. An attachment structure and attachment of the ring gear 52 to the lower body 411 will be described below in detail.

The planetary gears 51 are engaged with a carrier member 53 so that the planetary gears 51 are mutually connected with one another. The carrier member 53 is made of a synthetic resin material and the lower end thereof is connected with an output member 54. The output member 54 is made of a metal material and is connected to the aforementioned screw member 6. Accordingly, the carrier member 53 is connected to the screw member 6 via the output member 54 (see FIG. 3).

The aforementioned sun gear portion 492, the planetary gears 51, the ring gear 52 and the carrier member 53 form a planetary gear mechanism YG. The carrier member 53 is rotated in accordance with the rotation of the planetary gears 51, so that the carrier member 53 reduces the speed of the rotation of the sun gear portion 492 and outputs the rotation with the reduced speed to the screw member 6.

The driving force of the electric motor 3 is reduced firstly by the engagement between the pinion gear 43 and the first wheel gear 47 (a first stage speed reduction). Secondly, the driving force of the electric motor 3 is further reduced by the engagement between the gear portion 462 and the second wheel gear 50 (a second stage speed reduction). Thirdly, the driving force is still further reduced by the planetary gear mechanism YG (a third stage speed reduction) and then, the reduced driving force is transmitted to the screw member 6.

The attachment structure of the ring gear 52 to the gear body 41 is described below in detail with reference to FIGS. 4 and 5. Hatching is applied to the planetary gears 51, the ring gear 52 and cushion rubbers 55 in FIGS. 4 and 5 in order to distinguish components. The up-and-down direction in FIG. 3 corresponds to the axial direction of the invention and is referred to simply as the axial direction in the following explanation. Further, the circumferential direction of the ring gear 52 in FIG. 4B corresponds to the circumferential direction of the invention and is referred to simply as the circumferential direction in the following explanation. Still further, the radial direction of the ring gear 52 in FIG. 4B corresponds to the radial direction of the invention and is referred to simply as the radial direction in the following explanation.

Figure 5A:
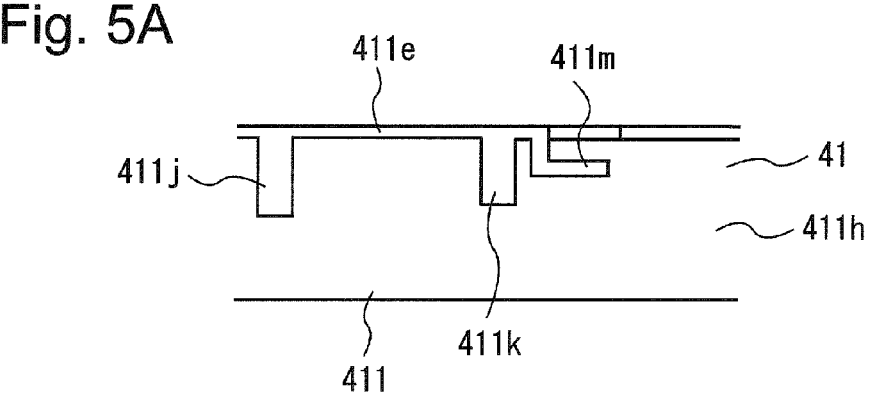
FIG. 5A is a view schematically illustrating the inner peripheral surface of the gear body shown in FIG. 4A being developed in a circumferential direction.

An inner peripheral surface 411*h* of the outer peripheral wall 411*d* of the lower body 411 is located at a position below the bearing fixing surface 411*e* and is formed in the perfect circular shape. As shown in FIGS. 4A and 5A, four (4) lock-side torque receivers 411*j* project from the inner peripheral surface 411*h* in the radially inward direction. The lock-side torque receivers 411*j* are formed at equal intervals in the circumferential direction.

Further, four (4) release-side torque receivers 411*k* project from the inner peripheral surface 411*h* of the lower body 411 in the radially inward direction. As with the lock-side torque receivers 411*j*, the release-side torque receivers 411*k* are formed at equal intervals in the circumferential direction. The release-side torque receivers 411*k* are arranged so that each release-side torque receiver 411*k* is located adjacent to the corresponding lock-side torque receiver 411*j* while keeping a predetermined distance therebetween in the circumferential direction. In a state where the gear 52 is inserted into the lower body 411, the lock-side torque receivers 411*j* and the release-side torque receivers 411*k* project toward an outer peripheral surface 521 of the ring gear 52.

A pair of engagement walls 411*m* project from the inner peripheral surface 411*h* of the lower body 411 in the radially inward direction (see FIGS. 4A and 5A). Each engagement wall 411*m* is not formed at an interval (which is indicated with a reference symbol G in FIG. 4A) between a pair of the lock-side torque receiver 411*j* and the release-side torque receiver 411*k*, which are located at positions closer to one another than other neighboring counterpart, but at positions other than the interval G between the closely neighboring lock-side torque receiver 411*j* and the release-side torque receiver 411*k*. Each engagement wall 411*m* extends in the circumferential direction at a position distanced from the bearing fixing surface 411*e* by a predetermined distance in the axial direction, and one end of each engagement wall 411*m* is connected to the bearing fixing surface 411*e* (see FIG. 5A).

On the other hand, the outer peripheral surface 521 of the ring gear 52 is formed to be insertable onto the inner peripheral surface 411*h* of the lower body 411. Four (4) stopper portions 522 project from the outer peripheral surface 521 of the ring gear 52 in the radially outward direction (see FIGS. 4B and 5B). The stopper portions 522 are provided at equal intervals so that the stopper portions 522 are distanced away from one another by a predetermined distance in the circumferential direction. The width of each stopper portion 522 in the circumferential direction is formed to be smaller than the interval G between the aforementioned closely neighboring lock-side torque receiver 411*j* and the release-side torque receiver 411*k*.

Figure 4B:
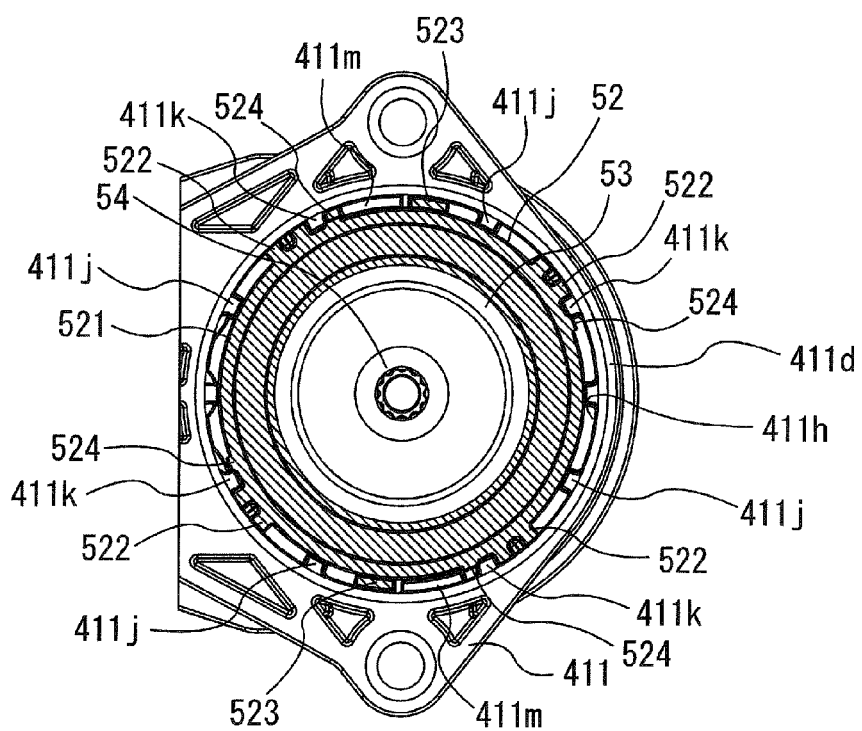
FIG. 4B is a view illustrating the reduction gear mechanism in a state in which the ring gear is inserted into the gear body in the axial direction.
Figure 4C:
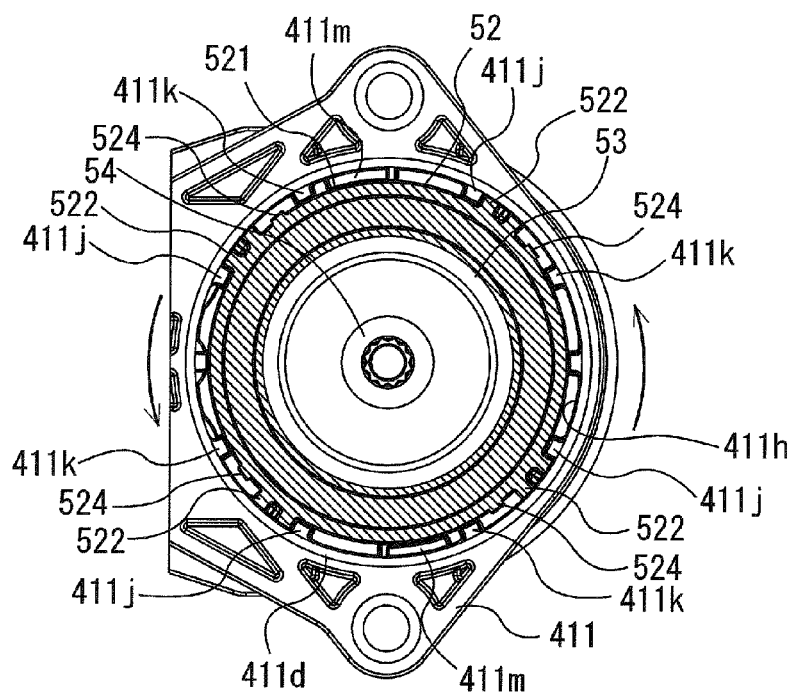
FIG. 4C is a view illustrating the reduction gear mechanism in a state in which the ring gear is rotated in a locking direction relative to the gear body.
Figure 5B:
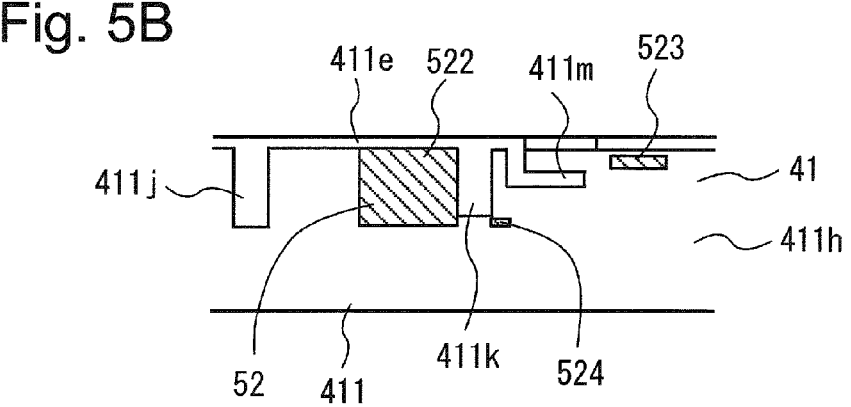
FIG. 5B is a view schematically illustrating an engaged portion between the gear body and ring gear shown in FIG. 4B being developed in the circumferential direction.
Figure 5C:
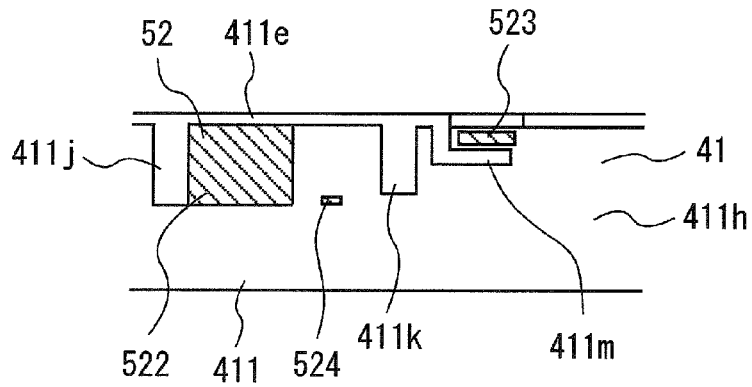
FIG. 5C is a view schematically illustrating the engaged portion between the gear body and ring gear shown in FIG. 4C being developed in the circumferential direction.

A pair of detachment prevention portions 523 project from the outer peripheral surface 521 of the ring gear 52 in the radially outward direction (see FIGS. 4B and 5B). Each detachment prevention portion 523 is arranged at a position located a predetermined distance away from each stopper portion 522 in the circumferential direction. Further, the detachment prevention portions 523 are arranged so as to face each other in the radial direction. Each detachment prevention portion 523 is formed so that the width thereof in the axial direction is smaller than the distance between the bearing fixing surface 411*e* and the engagement wall 411*m* (see FIG. 5B).

Further, four (4) retaining portions 524 project in the radially outward direction from the outer peripheral surface 521 of the ring gear 5. The retaining portions 524 are provided at equal intervals and each retaining portion 524 is arranged at a position adjacent to each stopper portion 522 in the circumferential direction.

Explained below is the attachment of the ring gear 52 to the lower body 411 after the planetary gears 51 and the carrier member 53 are attached to the gear body 41 (see FIG. 4A). The ring gear 52 is positioned in the circumferential direction so that each stopper portions 522 is located at the interval G between the pair of the lock-side torque receiver 411*j* and the release-side torque receiver 411*k*, which are located at the positions closer to one another than other neighboring counterpart on the lower body 411, and so that each detachment prevention portion 523 is located at a position avoiding each engagement wall 411*m*. While the ring gear 52 is positioned as described above, the ring gear 52 is inserted onto the inner peripheral surface 411*h* of the lower body 411 in the axial direction (see FIGS. 4B and 5B). The end portion of the ring gear 52 facing opposite to the parking brake actuator M faces the bearing fixing surface 411*e* while the ring gear 52 is inserted onto the inner peripheral surface 411*h* of the lower body 411. Further, while the above state is established, a clearance in the circumferential direction is formed between each detachment prevention portion 523 of the ring gear 52 and each engagement wall 411*m* of the gear body 41.

Then, the ring gear 52 is rotated in the circumferential direction (i.e. the counterclockwise direction in FIG. 4B, which is the left direction in FIG. 5B and which is hereafter referred to as a locking direction) until each stopper portion 522 contacts the circumferential end portion of each lock-side torque receiver 411*j*. While the ring gear 52 is rotated, each detachment prevention portion 523 is moved into a clearance formed between the bearing fixing surface 411*e* of the lower body 411 and each engagement wall 411*m* in accordance with the rotation of the ring gear 52 (see FIGS. 4C and 5C). Accordingly, each stopper portion 523 is contactable with each engagement wall 411*m*, so that the ring gear 52 is not allowed to be detached from the lower body 411 in the axial direction.

Thereafter, the cushion rubber 55 (which corresponds to an elastic member) is inserted into the clearance, which is formed between each stopper portion 522 of the ring gear 52 and each release-side torque receiver 411*k* of the lower body 411 in the circumferential direction, from below in the axial direction (see FIGS. 4D and 5D). Each cushion rubber 55 is inserted into the clearance while crossing over each retaining portion 524 of the ring gear 52. One end portion of the inserted cushion rubber 55 in the axial direction faces the bearing fixing surface 411*e* and the other end portion faces the corresponding retaining portion 524. Each cushion rubber 55 is formed so as to generate the elastic force in the circumferential direction between the ring gear 52 and the lower body 411, and as will be described below, each cushion rubber 55 functions as a buffering member between the ring gear 52 and the lower body 411. Each retaining portion 524 functions as a stopper that prevents each cushion rubber 55 from being detached in the axial direction.

Each cushion rubber 55 of this embodiment is made of, for example EPDM (Ethylene Propylene Diene Monomer) or an elastomer, and is formed in a flat plate shape. Alternatively, a plate spring and the like may be used to generate the elastic force between the ring gear 52 and the lower body 411 instead of the cushion rubber 55.

Figure 4D:
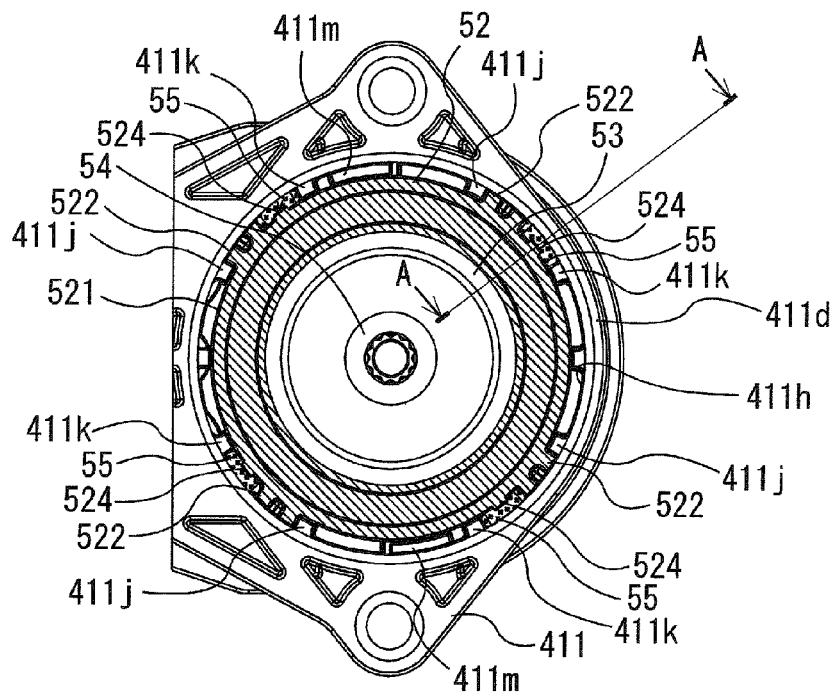
FIG. 4D is a view illustrating the reduction gear mechanism in a state in which a cushion rubber is inserted between the gear body and the ring gear.
Figure 4E:
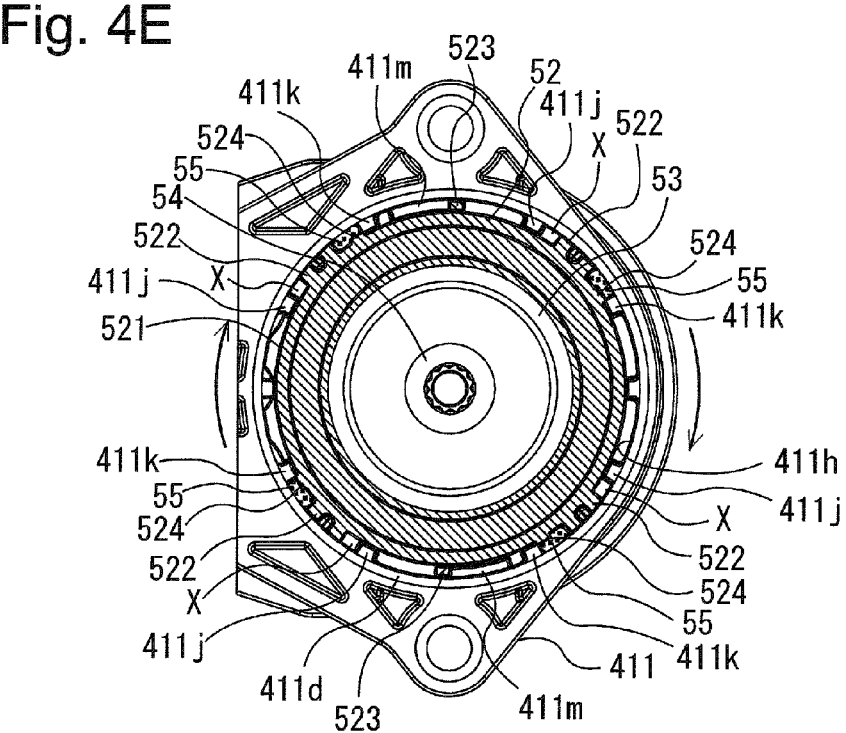
FIG. 4E is a view illustrating the reduction gear mechanism in a state in which the ring gear is rotated in a releasing direction relative to the gear body.
Figure 5D:
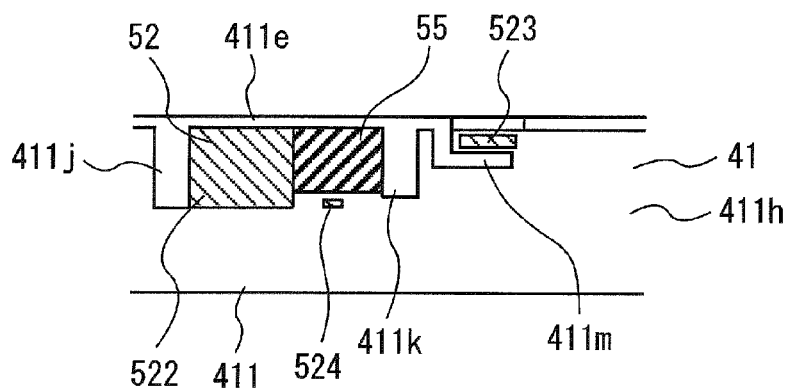
FIG. 5D is a view schematically illustrating the engaged portion between the gear body and the ring gear shown in FIG. 4D being developed in the circumferential direction.

Generally, the reduction gear mechanism 4 is in the state illustrated in FIGS. 4D and 5D while the parking brake is not operated. While the parking operation is not operated, a clearance equal to or more than zero (0) is formed between each cushion rubber 55 on one hand and each stopper portion 522 of the ring gear 52 and each release-side torque receiver 411*k* of the lower body 411 on the other hand in the circumferential direction. Furthermore, a clearance is formed between each cushion rubber 55 on one hand and each retaining portion 524 of the ring gear 52 and the bearing fixing surface 411*e* of the lower body 411 on the other hand in the axial direction. Still further, a clearance is formed between each cushion rubber 55 on one hand and the ring gear 52 and the lower body 411 on the other hand in the radial direction.

When the reduction gear mechanism 4 is actuated in accordance with actuation of the electric motor 3 upon the parking brake operation for generating the braking force at the vehicle wheel W, the ring gear 52 receives a load from the planetary gears 51 in the locking direction (i.e. the counterclockwise direction in FIG. 4D and in the left direction in FIG. 5D). Accordingly, the ring gear 52 is biased in the locking direction. However, because each stopper portion 522 contacts the circumferential end portion of each lock-side torque receiver 411*j* of the lower body 411, the ring gear 52 is not further rotated (see FIGS. 4D and 5D). Thereafter, a plurality of planetary gears 51 rotates along the inner peripheral side of the ring gear 52 in the locking direction, so that the driving force is applied to the screw member 6 and therefore the braking force is applied to the vehicle wheel W. Even when the parking brake is operated, the clearance equal to or more than zero (0) is formed in the circumferential direction between each cushion rubber 55 on one hand and the ring gear 52 and the lower body 411 on the other hand.

On the other hand, when the electric motor 3 is actuated reverse to the above-mentioned case upon releasing of the parking brake operation for cancelling the braking force to be applied to the vehicle wheel W, the gear members (the first wheel gear 47 and the like) within the reduction gear mechanism 4 is actuated in a returning direction. However, the screw member 6 establishes the aforementioned self-lock state together with the nut member 7. Therefore, the screw member 6 is not immediately rotated in the returning direction in accordance with the reduction gear mechanism 4.

Then, after a brief period of time has elapsed, the lock state between the screw member 6 and the nut member 7 is cancelled, and the screw member 6 rotates in the retuning direction, thereby the planetary gears 51 are rotated in the counterclockwise direction in FIG. 4D and in the right direction in FIG. 5D (which is hereinafter referred to as a releasing direction) via the output member 54 and the carrier member 53. Accordingly, the ring gear 52 receives the load from the planetary gears 51 and rotates in the above-mentioned direction by a predetermined amount while compressing the cushion rubbers 55. In this case, each cushion rubber 55 is compressed between each stopper portion 522 and each release-side torque receiver 411k and generates the elastic force in the circumferential direction between the ring gear 52 and the lower body 411. On the other hand, while the above state is established, a clearance X is formed in the circumferential direction between each stopper portion 522 of the ring gear 52 and each lock-side torque receiver 411j of the lower body 411 (see FIGS. 4E and 5E).

Figure 6:
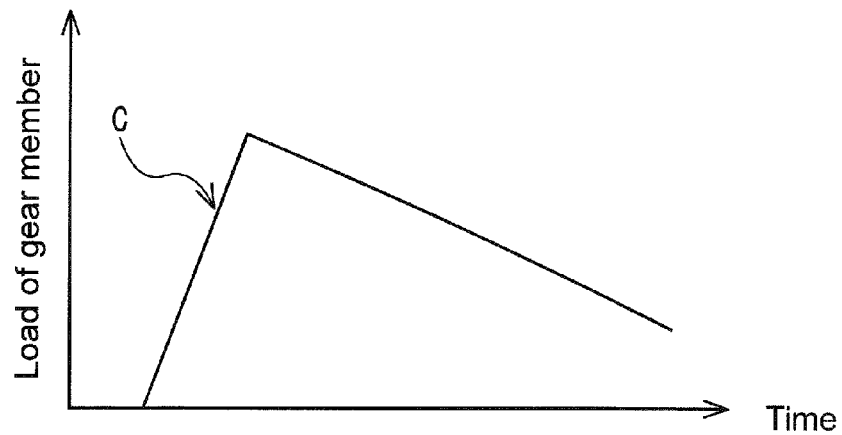
FIG. 6 is a graph schematically showing a load characteristic of the gear member included in the reduction gear mechanism illustrated in FIG. 3 when a parking brake operation is released.

The aforementioned impact generated by a sudden return of the screw member 6 is absorbed by the rotation of the ring gear 52 in the releasing direction while compressing the cushion rubbers 55, therefore a sudden increase of the load to be applied to the gear members within the reduction gear mechanism 4 is avoided (see line C in FIG. 6). The compression of the cushion rubbers 55 prevents the impact generated when the screw member 6 returns from being transmitted to the electric motor 3. Therefore, the impact is reduced even in the case where the clearance formed between the gear members of the reduction gear mechanism 4 before the screw member 6 returns is located closer to the electric motor 3 than to the cushion rubbers 55 and in the case where the aforementioned clearance is located closer to the screw member 6 than to the cushion rubbers 55.

Figure 5E:
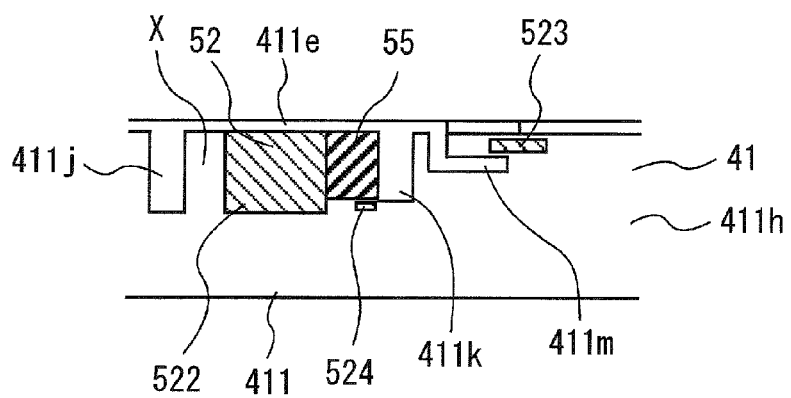
FIG. 5E is a view schematically illustrating the engaged portion between the gear body and the gear ring shown in FIG. 4E being developed in the circumferential direction.

Further, the detachment prevention portions 523 are continuously contactable with the corresponding engagement walls 411m even while the cushion rubbers 55 are compressed as shown in FIG. 5E, thereby the ring gear 52 is prevented from falling off from the lower body 411 in the axial direction.

Once each cushion rubber 55 is compressed by a predetermined amount and generates a predetermined compression load, the cushion rubber 55 is not further compressed even when the load is applied thereto from the planetary gears 51. Hence, because plural planetary gears 51 rotate along the inner peripheral side of the ring gear 52 in the releasing direction thereafter, the braking force to be applied to the vehicle wheel W is cancelled.

According to the embodiment, the cushion rubbers 55, which are compressible in the circumferential direction upon the rotation of the ring gear 52 relative to the gear body 41, are interposed between the ring gear 52 and the gear body 41 of the reduction gear mechanism 4, therefore the sudden increase of the load to be applied to the gear members within the reduction gear mechanism 4 is prevented upon the release of the parking brake operation, which may result in reducing impact sound and vibration to be generated within the reduction gear mechanism 4.

Further, because the impact sound and the like to be generated within the reduction gear mechanism 4 is reduced only by adding the cushion rubbers 55 to the reduction gear mechanism 4, the electric parking brake driving device D is easily assembled and therefore the electric parking brake driving device D with low costs may be achieved.

Still further, because of the attachment structure of the ring gear 52 to the gear body 41 with using the cushion rubbers 55, the ring gear 52 and the gear body 41 are assembled as a unit, therefore a manufacturing operation of the reduction gear mechanism 4 may be simplified.

Further, because each cushion rubber 55 is provided while forming the clearance equal to or more than zero (0) in the circumferential direction relative to the ring gear 52 and the gear body 41 while the parking brake is operated, the compression load of each cushion rubber 55 rises from zero (0) in the case where the ring gear 52 is rotated in the releasing direction relative to the gear body 41. Consequently, an absorption range of the load applied to the gear members within the reduction gear mechanism 4 is enlarged, so that a load absorption function is enhanced.

The clearance in the circumferential direction formed between each cushion rubber 55 on one hand and the ring gear 52 and the gear body 41 on the other hand is set to be equal to or more than zero (0) while the parking brake is not operated, so that the cushion rubber 55 is easily inserted between the ring gear 52 and the gear body 41.

Forming a clearance also in the axial direction between each cushion rubber 55 on one hand and the ring gear 52 and the gear body 41 on the other hand contributes to reduce sliding friction in the axial direction generated by each cushion rubber 55 against the ring gear 52 and the gear body 41, which may result in further enhancing the absorption function of the load acting on the gear members within the reduction gear mechanism 4.

Forming a clearance also in the radial direction between each cushion rubber 55 on one hand and the ring gear 52 and the gear body 41 on the other hand contributes to reduce the sliding friction in the radial direction generated by each cushion rubber 55 against the ring gear 52 and the gear body 41, which may result in even further enhancing the absorption function of the load acting on the gear members within the reduction gear mechanism 4.

According to this embodiment, the ring gear 52 is attached to the gear body 41 in such a manner that the ring gear 52 is inserted into the gear body 41 in the axial direction while each stopper portion 522 is positioned between the corresponding lock-side torque receiver 411j and the corresponding release-side torque receiver 411k and while each detachment prevention portion 523 is located at the position avoiding the corresponding engagement wall 411m. Then, the ring gear 52 is rotated in the circumferential direction so that each stopper portion 522 is moved closer to the corresponding lock-side torque receiver 411j, thereby each stopper portion 523 is moved to be positioned between the bearing fixing surface 411e and the corresponding engagement wall 411m. Thereafter, the cushion rubber 55 is inserted in the axial direction into the clearance formed in the circumferential direction between each stopper portion 522 and the corresponding release-side torque receiver 411k.

Accordingly, the ring gear 52 is attached to the gear body 41 simply by rotating the ring gear 52 in the circumferential direction. Hence, the ring gear 52 is easily attached to and detached from the gear body 41. Furthermore, the cushion rubber 55 is easily attached to the gear body 41 simply by inserting the cushion rubber 55 into the clearance formed between each stopper portion 522 and the corresponding release-side torque receiver 411k.

Further, the cushion rubber 55 is inserted into the clearance formed in the circumferential direction between each stopper portion 522 and the corresponding release-side torque receiver 411k. Accordingly, the ring gear 52 is not allowed to rotate in a direction by which each stopper portion 522 is moved closer to the corresponding release-side torque receiver 411k, so that each stopper portion 523 is avoided from being disengaged from the corresponding engagement wall 411m and therefore the ring gear 52 is avoided from being detached from the gear body 41 in the axial direction.

Further, because each retaining portion 524 faces the corresponding elastic member 55 in the axial direction, the cushion rubber 55 is avoided from falling off from the clearance formed between the ring gear 52 and the lower body 411.

Still further, because each cushion rubber 55 is insertable in the axial direction while crossing over the corresponding retaining portion 524, the cushion rubber 55 is easily attached to the ring gear 52.

The gear body 41 includes therein the pinion gear 43 fixed on the output shaft 32 of the electric motor 3; the gear member 46 rotatably supported by the gear body 41; the first wheel gear 47 formed on the gear member 46, having a greater number of teeth than the pinon gear 43, reducing the rotational speed of the electric motor 3 by being meshed with the pinion gear 43 and transmitting the reduced rotational speed to the gear member 46; the gear portion 462 formed on the gear member 46 and rotating unitary with the first wheel gear 47; the gear shaft 49 rotatably supported by the gear body 41; the second wheel gear 50 formed on the gear shaft 49, having a greater number of teeth than the gear portion 462, and meshing with the gear portion 462; and the sun gear portion 492 formed on the gear shaft 49 and rotating unitary with the second wheel gear 50, so that the rotation of the electric motor 3 is reduced by the three-stage reduction gear mechanism, thereby driving torque acting on the screw member 6 is increased and therefore the braking force applied to the vehicle wheel W is increased.

Further, because the planetary gear mechanism YG having the impact absorption function by means of the cushion rubbers 55 is arranged at the last stage within the reduction gear mechanism 4, deformation of the cushion rubbers 55 upon the release of the parking brake operation may be reduced.

[Second Embodiment]

Figure 7:
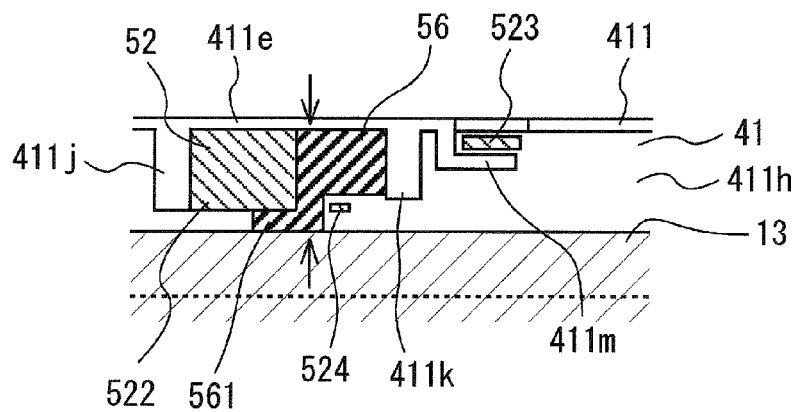
FIG. 7 is a view schematically illustrating the engaged portion between the gear body and the ring gear according to a second embodiment being developed in the circumferential direction.

The attachment structure of the ring gear 52 to the lower body 411 according to the second embodiment will be described below with reference to FIG. 7. A cushion rubber 56 according to the second embodiment is formed so that the end portion thereof located closer to the corresponding stopper portion 522 of the ring gear 52 extends in the downward direction to form a holding portion 561. The holding portion 561 extends in the circumferential direction below the corresponding stopper portion 522. The holding portion 561 has a predetermined tightening allowance in the axial direction between the upper end surface of the caliper body 13, which is fixed on the lower body 411, and the lower end portion of the corresponding stopper portion 522. Therefore, as shown in FIG. 7, the holding portion 561 is squeezed between the upper end surface of the caliper body 13 and the lower end portion of the stopper portion 522 while the cushion rubber 56 is interposed between the ring gear 52 and the lower body 411.

Each stopper portion 522 receiving the elastic force from the corresponding holding portion 561 contacts the bearing fixing surface 411e of the lower body 411 with the upper end portion of the stopper portion 522. The detachment prevention portions 523 of the ring gear 52 are preferably located at positions at which the detaching prevention portions 523 do not contact both of the bearing fixing surface 411e and the corresponding engagement walls 411m of the lower body 411 in the axial direction while the above-mentioned state is formed. Other structures of the driving device D of the second embodiment is similar to the structure of the driving device D of the aforementioned first embodiment, therefore further explanation is omitted here.

According to the driving device D of the second embodiment, each cushion rubber 56 includes the tightening allowance in the axial direction of the ring gear 52 between the ring gear 52 and the caliper body 13. Therefore, the ring gear 52 is retainable in the axial direction relative to the gear body 41, thereby the generation of the noise and the like by the vibration may be reduced.

Further, in the case in which each cushion rubber 56 is formed to include the tightening allowance in the radial direction between the ring gear 52 and the gear body 41, the cushion rubber 56 is compressed in the radial direction between the ring gear 52 and the gear body 41, so that the ring gear 52 is retained in the radial direction relative to the gear body 41, which may result in reducing the generation of the noise and the like by the vibration.

[Third Embodiment]

Figure 8:
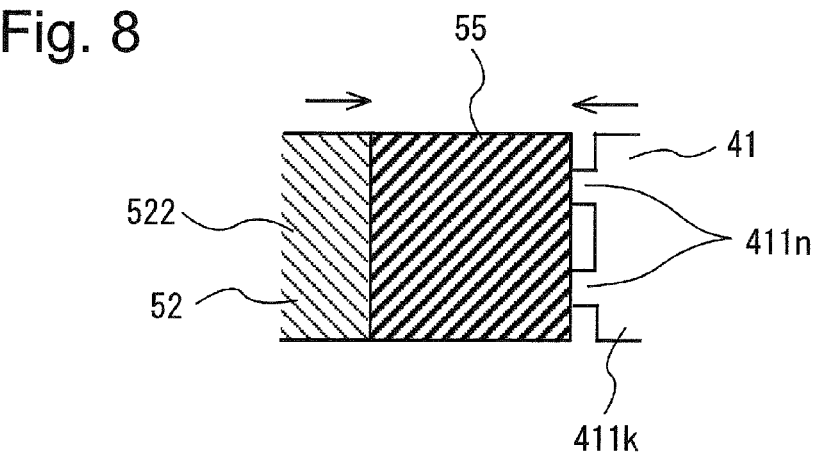
FIG. 8 is a view schematically illustrating the gear body, the ring gear and the cushion rubber according to a third embodiment being viewed from a radially outward direction.

The engagement structure between the ring gear 52 and the lower body 411 according to the third embodiment will be explained below with reference to FIG. 8. A pair of projection portions 411n project in the circumferential direction from each release-side torque receiver 411k of the third embodiment toward the corresponding cushion rubber 55. Each cushion rubber 55 includes a slight tightening allowance in the circumferential direction between the end surface of the corresponding stopper portion 522 of the ring gear 52 and the end portions of the corresponding projection portions 411n. In the case where the ring gear 52 is rotated in the releasing direction while the above-mentioned state is established, each cushion rubber 55 is deformable into a clearance formed between the pair of projection portions 411n, or upward of one of the projection portions 411n located above the other projection portion 411n, or downward of the other projection portion 411n located below the one of the projection portions 411n.

Accordingly, the third embodiment is substantially the same as the aforementioned first embodiment in which the clearance in the circumferential direction formed between each cushion rubber 55 on one hand and the ring gear 52 and the lower body 411 on the other hand is set to be equal to or more than zero (0). Hence, in the case where the ring gear 52 is rotated in the releasing direction relative to the gear body 41, the compression load of the cushion rubber 55 rises from zero (0). The invention includes the engagement structure between the ring gear 52 and the gear body 41 as described in the third embodiment.

[Fourth Embodiment]

Figure 9A:
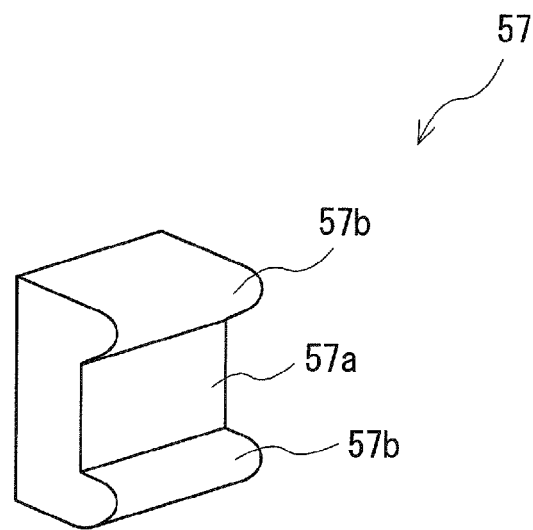
FIG. 9A is an outer perspective view of the cushion rubber according to a fourth embodiment.

A cushion rubber 57 according to the fourth embodiment and the insertion of the cushion rubber 57 into the clearance formed between the ring gear 52 and the lower body 411 will be explained below with reference to FIGS. 9A and 9B. The cushion rubber 57 according to the fourth embodiment is integrally formed as one piece by a similar material as the cushion rubber 55 of the first embodiment. As illustrated in FIG. 9A, the cushion rubber 57 includes a flat plate portion 57a (which corresponds to a base portion) and a pair of holding ribs 57b, each of which is provided at each end portion of the flat plate portion 57a. The holding ribs 57b are formed on one surface of the flat plate portion 57a. The cushion rubber 57 is inserted between the ring gear 52 and the lower body 411 in the up-and-down direction in FIG. 9A as an insertion direction.

Figure 9B:
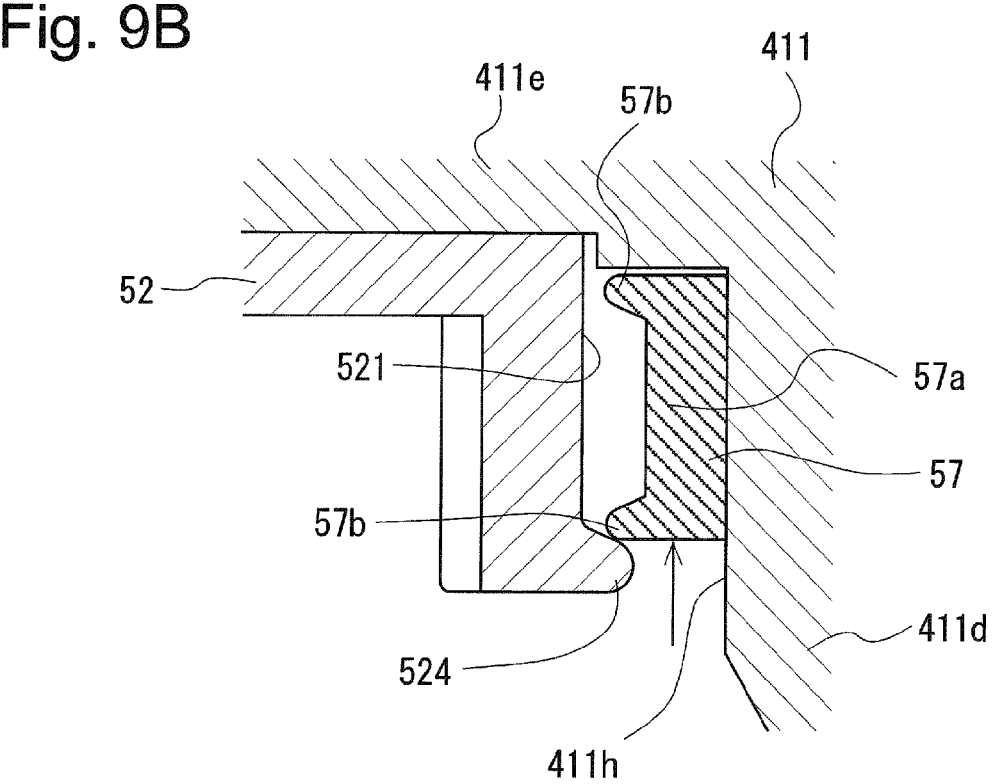
FIG. 9B is a cross sectional view illustrating the cushion rubber shown in FIG. 9A in a state in which the cushion rubber is inserted between the gear body and the ring gear taken along line A-A in FIG. 4D.

As illustrated in FIG. 9B, the cushion rubber 57 is formed so that the holding ribs 57b are located at the front end portion and the rear end portion of the cushion rubber 57, respectively, in the insertion direction (which is indicated by the arrow in FIG. 9B) and so that the holding ribs 57b project from the flat plate portion 57a toward the outer peripheral surface 521 of the ring gear 52 while in the state in which the cushion rubber 57 is inserted between the ring gear 52 and the lower body 411. The holding ribs 57b are not necessarily formed at both of the front end and rear end portions of the flat plate portion 57a, respectively. Alternatively, one holding rib 57b may be formed only at the rear end portion of the cushion rubber 57 in the insertion direction (i.e. at the lower portion of the cushion rubber 57 in FIG. 9B).

Further, the thickness of the flat plate portion 57a in the radial direction is formed to be equal to or thinner than the clearance formed between the retaining portion 524 of the ring gear 52 and the inner peripheral surface 411h of the lower body 411 (see FIG. 9B). Still further, the thickness of the ring gear 52 in the radial direction at the positions where the holding ribs 57b are formed is formed to be greater than the clearance formed between the retaining portion 524 of the ring gear 52 and the inner peripheral surface 411h of the lower body 411.

The cushion rubber 57 is attached between the ring gear 52 and the lower body 411 in such a manner that the cushion rubber 57 is inserted therebetween while being deformed and while the holding ribs 57b contact the retaining portion 524 one by one. The cushion rubber 57 inserted between the ring gear 52 and the lower body 411 is prevented from falling off from the clearance formed between the ring gear 52 and the lower body 411 by the holding rib 57b located at the rear end portion of the cushion rubber 57 (i.e. the holding rib 57b at the lower portion of the cushion rubber 57 in FIG. 9B) contacting the retaining portion 524.

According to the fourth embodiment, the cushion rubber 57 includes the flat plate portion 57a whose thickness in the radial direction while in the state in which the cushion rubber 57 is inserted between the lower body 411 and the ring gear 52 is formed to be equal to or smaller than the clearance formed between the retaining portion 524 of the ring gear 52 and the inner peripheral surface 411h of the lower body 411, and the holding rib 57b formed at the rear end portion of the flat plate portion 57a in the insertion direction to the clearance formed between the lower body 411 and the ring gear 52 and projecting toward the outer peripheral surface 521 of the ring gear 52. The thickness of the cushion rubber 57 in the radial direction at the position where the holding rib 57b is formed is greater than the clearance formed between the retaining portion 524 of the ring gear 52 and the inner peripheral surface 411h of the lower body 411. Therefore, the cushion rubber 57 is easily inserted between the lower body 411 and the ring gear 52 by deforming the cushion rubber 57 and the holding rib 57b passing over the retaining portion 524.

Further, because the holding rib 57b contacts the retaining portion 524 after the cushion rubber 57 is inserted between the lower body 411 and the ring gear 52, the cushion rubber 57 is surely prevented from falling off from the clearance formed between the ring gear 52 and the lower body 411.

The holding rib 57b of the cushion rubber 57 is formed at both end portions of the flat plate portion 57a, so that the cushion rubber 57 is stably retained between the lower body 411 and the ring gear 52.

Further, because the holding rib 57b of the cushion rubber 57 is formed at each of both end portions of the flat plate portion 57a, orientation of the cushion rubber 57 is not necessary when inserting the cushion rubber 57 into the clearance formed between the lower body 411 and the ring gear 52, so that the work efficiency when the cushion rubber 57 is inserted between the ring gear 52 and the lower body 411 may be improved.

[Fifth Embodiment]

Figure 10A:
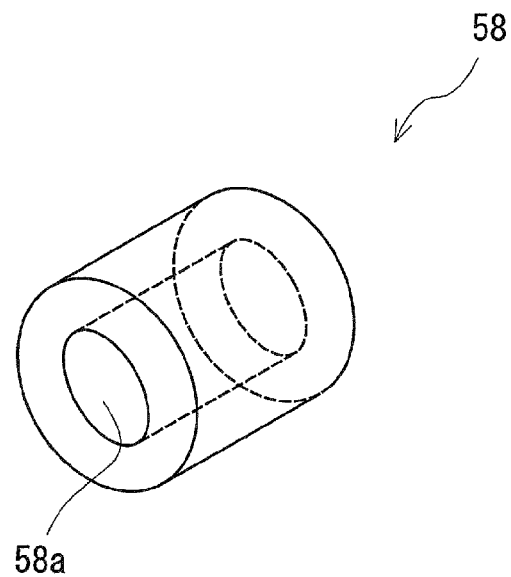
FIG. 10A is an outer perspective view of the cushion rubber according to a fifth embodiment.

A cushion rubber 58 according to the fifth embodiment and the insertion of the cushion rubber 58 into the clearance formed between the ring gear 52 and the lower body 411 will be explained below with reference to FIGS. 10A and 10B. The cushion rubber 58 according to the fifth embodiment is integrally formed as one piece by a similar material as the cushion rubber 55 of the first embodiment. As shown in FIG. 10A, the cushion rubber 58 includes therein a through bore 58a (which corresponds to a space) and is formed in a sleeve shape having a predetermined length. The cross section at any desired position of the cushion rubber 58 taken along a line perpendicular to the lengthwise direction is formed in a ring-shape (a perfect circular shape).

Figure 10B:
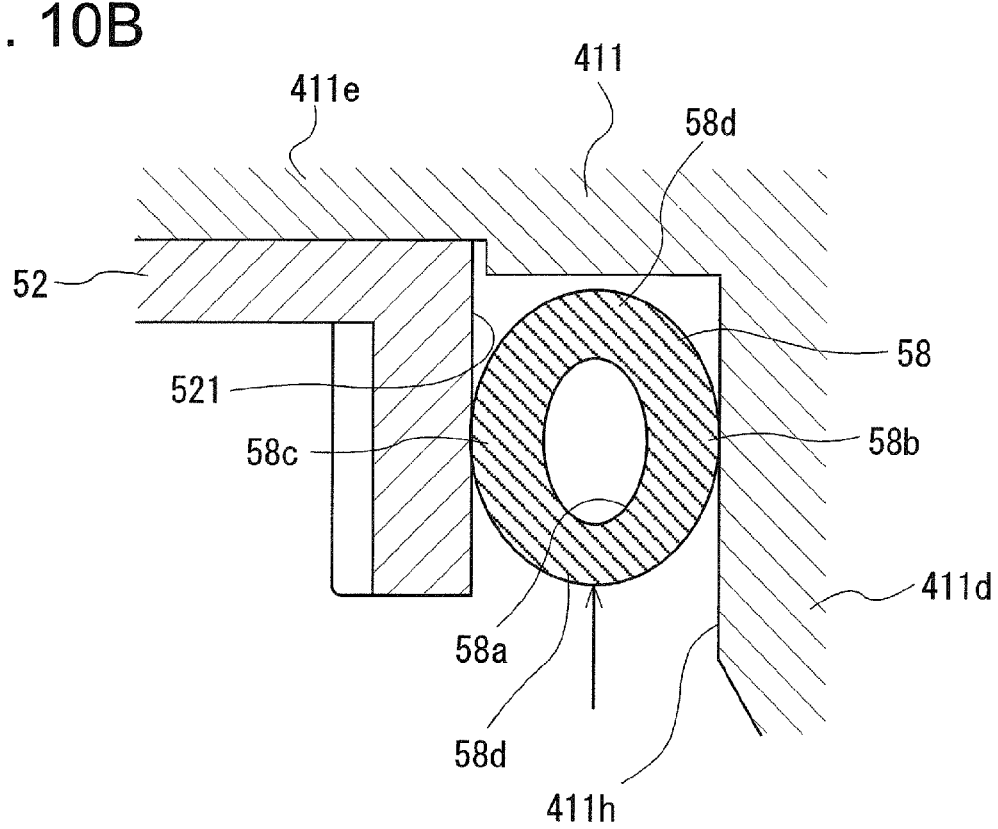
FIG. 10B is a cross sectional view illustrating the cushion rubber shown in FIG. 10A to be cut in the radial direction in order to show a state in which the cushion rubber is inserted between the gear body and the ring gear.

As shown in FIG. 10B, in a process of inserting the cushion rubber 58 between the ring gear 52 and the lower body 411 in the arrow direction so that the lengthwise direction of the cushion rubber 58 extends in the circumferential direction, the cushion rubber 58 is moved into the clearance formed between the ring gear 52 and the lower body 411 while the through bore 58a is compressed by the ring gear 52 and the lower body 411.

While the cushion rubber 58 is attached between the ring gear 52 and the lower body 411, an outer-side portion 58b, which faces an inner-side portion 58c of the cushion rubber 58, contacts the inner peripheral surface 411h of the lower body 411 and the inner-side portion 58c contacts the outer peripheral surface 521 of the ring gear 52. The outer-side portion 58b and the inner-side portion 58c are portions of the cushion rubber 58 at any desired locations facing each other in the circumferential direction. Those portions of the cushion rubber 58 are referred to as the outer-side portion 58b and the inner-side portion 58c for convenience of explanation.

The outer-side portion 58b and the inner-side portion 58c are connected with one another by a pair of bridges 58d (which corresponds to connecting portions), and the aforementioned through bore 58a is formed between the outer-side portion 58b and the inner-side portion 58c.

As described above, the cushion rubber 58 is inserted and retained between the ring gear 52 and the lower body 411 in such a manner that the outer-side portion 58b and the inner-side portion 58c are deformed and the through bore 58a is compressed so that the outer-side portion 58b and the inner-side portion 58c are positioned close to each other in the radial direction while the cushion rubber 58 has restoring force in a direction by which the cushion rubber 58 expands to the left and right in FIG. 10B. Accordingly, as shown in FIG. 10B, the retaining portion 524 is not necessarily provided at the ring gear 52.

According to the fifth embodiment, the cushion rubber 58 is interposed and retained between the lower body 411 and the ring gear 52 in such a manner that the outer-side portion 58b contacts the inner peripheral surface 411h of the lower body 411 and the inner-side portion 58c contacts the outer peripheral surface 521 of the ring gear 52, so that the outer-side portion 58b and the inner-side portion 58c are deformed to compress the through bore 58a thereby the outer-side portion 58b and the inner-side portion 58c are positioned closer to each other in the radial direction, while the cushion rubber 58 has the restoring force. Therefore, the cushion rubber 58 is prevented from falling off from the clearance formed between the lower body 411 and the ring gear 52 by the restoring force.

Further, the cushion rubber 58 is easily inserted between the lower body 411 and the ring gear 52 by deforming the outer-side portion 58b and the inner-side portion 58c so as to compress the through bore 58a.

[Sixth Embodiment]

Figure 11A:
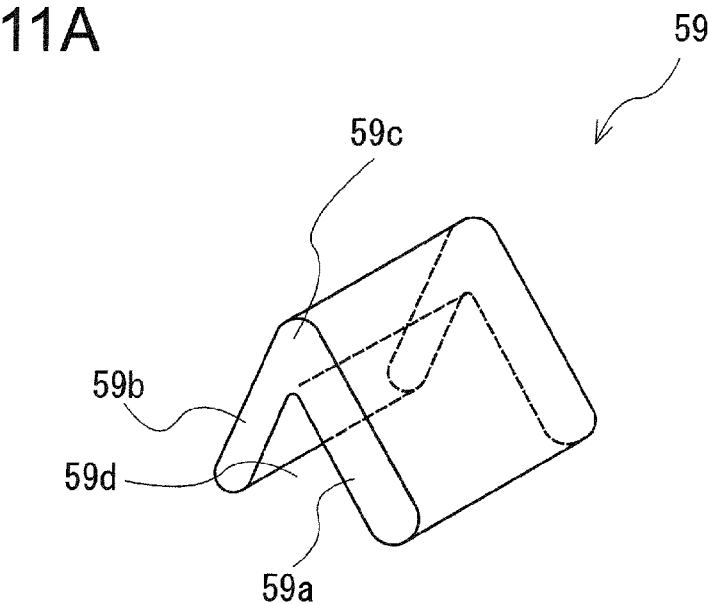
FIG. 11A is an outer perspective view of the cushion rubber according to a sixth embodiment.

A cushion rubber 59 according to the sixth embodiment and the insertion of the cushion rubber 59 between the ring gear 52 and the lower body 411 will be explained below with reference to FIGS. 11A and 11B. The cushion rubber 59 according to the sixth embodiment is integrally formed as one piece by a similar material to the cushion rubber 55 of the first embodiment. As illustrated in FIG. 11A, the cushion rubber 59 is formed to have a predetermined length, more specifically, the cushion rubber 59 is formed so that an outer piece 59a (which corresponds to the outer-side portion) and an inner piece 59b (which corresponds to the inner-side portion), which form a predetermined angle therebetween, are connected by a bridge 59c (which corresponds to the connecting portion). Hence, the cross section of the cushion rubber 59 at any desired location taken along a line perpendicular to the lengthwise direction thereof is formed in a V-shape. A space 59d is formed between the outer piece 59a and the inner piece 59b, so that the outer piece 59a and the inner piece 59b are deformable in a direction by which the outer piece 59a and the inner piece 59b are moved closer to each other.

Figure 11B:
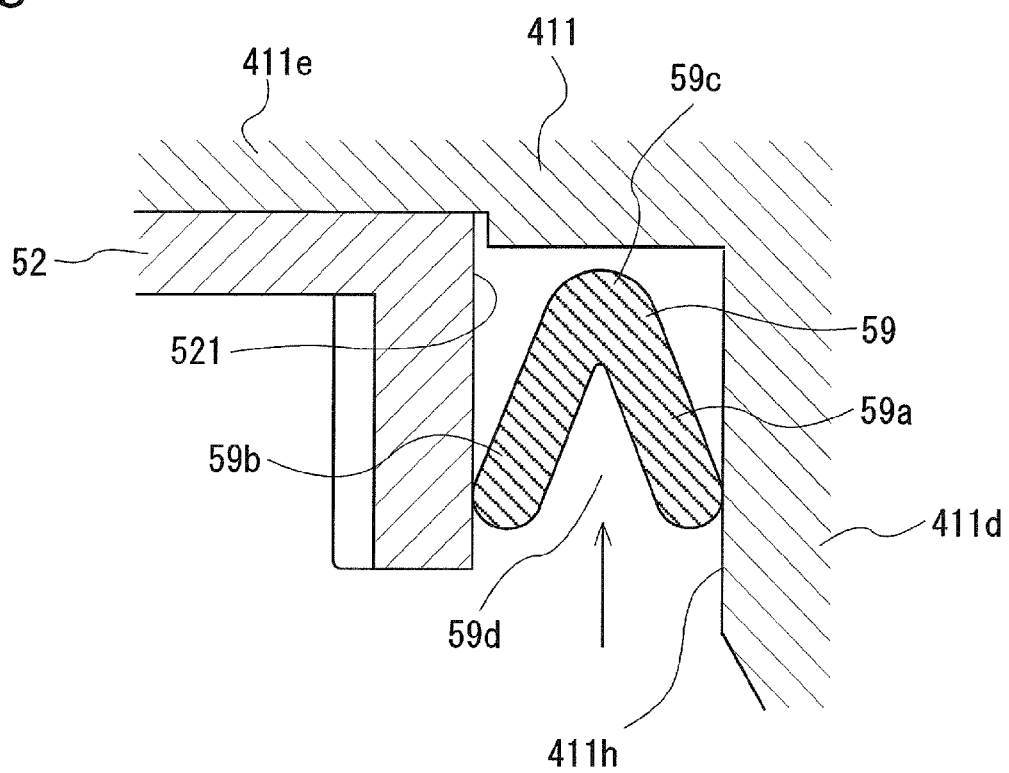
FIG. 11B is a cross sectional view illustrating the cushion rubber shown in FIG. 11A to be cut in the radial direction in order to show a state in which the cushion rubber is inserted between the gear body and the ring gear.
Figure 12A:
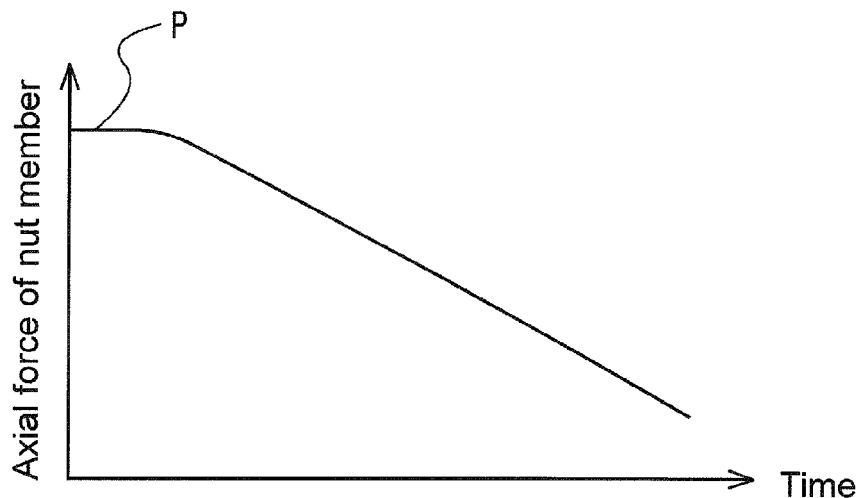
FIG. 12A is a graph schematically illustrating axial force of a nut member when the parking brake operation is released according to an electric parking brake device of a known technology.
Figure 12B:
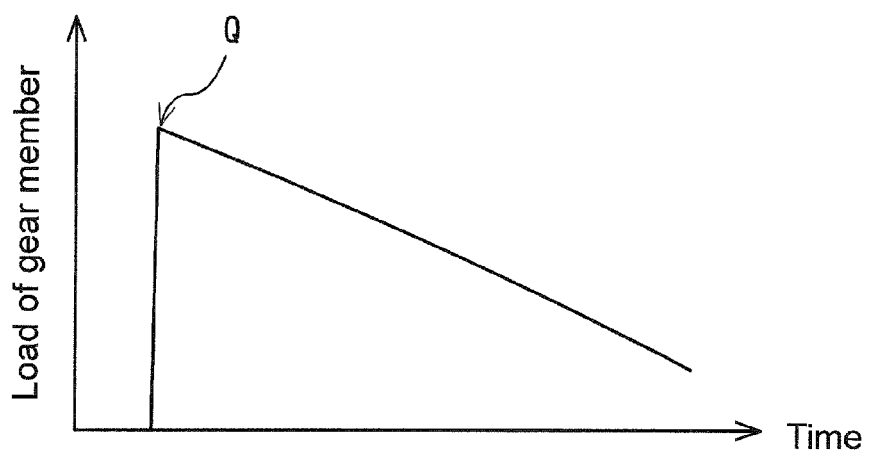
FIG. 12B is a graph schematically illustrating a load characteristic of a gear member when the parking brake operation is released according to the electric parking brake device of the known technology.
Figure 12C:
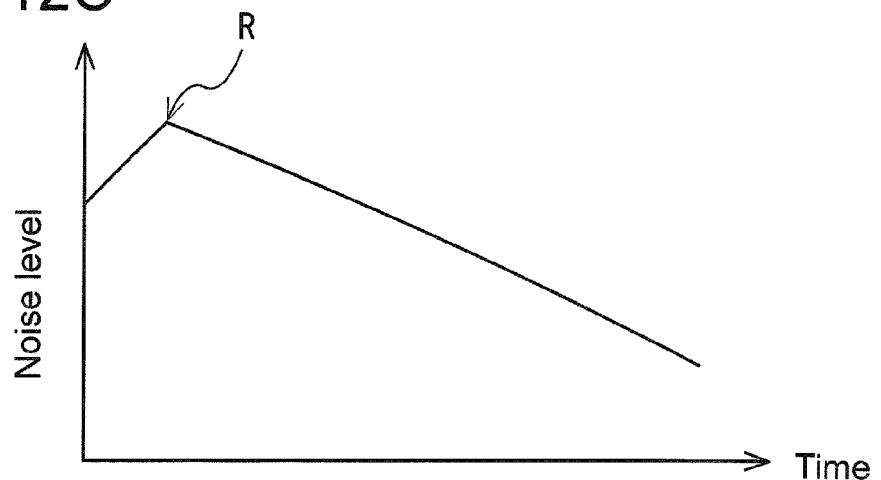
FIG. 12C is a graph schematically illustrating a level of noise generated upon release of the parking brake operation according to the electric parking device of the known technology.

As shown in FIG. 11B, the cushion rubber 59 is inserted between the ring gear 52 and the lower body 411 in the arrow direction in the state in which the lengthwise direction of the cushion rubber 59 extends in the circumferential direction so that the outer piece 59a contacts the inner peripheral surface 411h of the lower body 411 and the inner piece 59b contacts the outer peripheral surface 521 of the ring gear 52. The cushion rubber 59 is inserted and retained between the ring gear 52 and the lower body 411 in such a manner that the outer piece 59a and the inner piece 59b are deformed to compress the space 59d so that the outer piece 59a and the inner piece 59b are located closer to each other in the radial direction, while the cushion rubber has the restoring force in the direction by which the cushion rubber 59 expands to the left and right in FIG. 11B. Accordingly, as with the case of the fifth embodiment, the retaining portion 524 is not necessarily provided at the ring gear 52.

[Other Embodiments]

The present invention is not limited to the embodiments described above, and the present invention may be modified or expanded as follows.

In the above-described embodiments, the parking brake actuator M functions also as a brake device for foot brake. Alternatively, the brake device for foot brake may be provided separately from the parking brake actuator M.

Further, an elastic member may be provided between the lower body 411 and the ring gear 52, so that the elastic member is extended in the circumferential direction in accordance with the rotation of the ring gear 52 in the releasing direction relative to the gear body 41 in order to reduce the generation of the impact sound and the vibration within the reduction gear mechanism 4.

The first embodiment may be modified so that a tightening allowance is provided between the cushion rubber 55 on one hand and the ring gear 52 and the gear body 41 on the other hand in the axial direction and/or in the radial direction.

Further, the present invention is applicable also to an opposed-type disc brake in which both side surfaces of the disc rotor 9 is pressed by a piston, in addition to a floating-type disc brake in which the disc rotor 9 is squeezed by the claw portions 13a of the caliper body 13 and the piston 8.

The electric motor 3 may be directly attached to the caliper body 13.

In the case in which the ring gear 52 not having the retaining portions 524 is used, a cushion rubber having any cross-sectional shape such as a rectangular shape or a triangular shape is applicable as long as the cushion rubber includes an outer-side portion contacting the inner peripheral surface 411h of the lower body 411, an inner-side portion contacting the outer peripheral surface 521 of the ring gear 52, and a compressible space between the outer-side portion and the inner-side portion, in addition to the cushion rubber 58 whose cross-section is in the ring shape as is described in the fifth embodiment and the cushion rubber 59 whose cross section is in the V-shape as is described in the sixth embodiment.

Still further, the fifth embodiment and the sixth embodiment may be modified so that the retaining portions 524 are formed on the outer peripheral surface 521 of the ring gear 52.

INDUSTRIAL APPLICABILITY

The electric parking brake driving device and the electric parking brake device according to the invention are applicable to a four-wheeled vehicle, a two-wheeled vehicle and other vehicles.

REFERENCE SIGNS LIST

In the drawings:
3: electric motor, 4: reduction gear mechanism, 6: screw member (rotating member), 7: nut member (translatory member), 8: piston, 9: disc rotor (disc), 13: caliper body (housing), 21a: first brake pad (brake pad), 21b: second brake pad (brake pad), 32: output shaft, 41: gear body (housing), 43: pinion gear (drive gear), 46: gear member (first rotating shaft), 47: first wheel gear (first driven gear), 49: gear shaft (second rotating shaft), 50: second wheel gear (second driven gear), 51: planetary gear, 52: ring gear, 53: carrier member, 55, 56, 57, 58, 59: cushion rubber (elastic member), 57a: flat plate portion (base portion), 57b: holding rib, 58a: through bore (space), 58b: outer-side portion, 58c: inner-side portion, 58d, 59c: bridge (connecting portion), 59a: outer piece (outer-side portion), 59b: inner piece (inner-side portion), 59d: space, 411d: outer peripheral wall (outer wall), 411e: bearing fixing surface (accommodating surface), 411h: inner peripheral surface of lower body, 411j: lock-side torque receiver, 411k: release-side torque receiver, 411m: engagement wall, 462: gear portion (transmitting gear), 492: sun gear portion (sun gear), 521: outer peripheral surface of ring gear, 522: stopper portion, 523: detachment prevention portion, 524: retaining portion, D: electric parking brake driving device, M: parking brake actuator, N: knuckle arm (vehicle body), P: electric parking brake device, and W: vehicle wheel.

The invention claimed is:

1. An electric parking brake driving device for driving a parking brake actuator which generates a braking force and applies the braking force to a vehicle wheel in such a manner that the parking brake actuator converts a rotational motion from a rotating member into a translatory motion, transmits the converted translatory motion to a piston and pushes a disk rotated together with the vehicle wheel by means of a brake pad biased by the piston, the electric parking brake driving device comprising:

an electric motor; and a reduction gear mechanism for transmitting a driving force of the electric motor to the rotating member, wherein the reduction gear mechanism includes:

a housing;

a sun gear provided within the housing and receiving the driving force of the electric motor;

a plurality of planetary gears engaged with the sun gear and rotating along an outer circumference of the sun gear in accordance with rotation of the sun gear;

a ring gear arranged to surround the planetary gears, engaged with the planetary gears at an inner peripheral surface of the ring gear, and attached to the housing; and a carrier member connecting the plurality of planetary gears with one another, connected to the rotating member, rotated in accordance with rotation of the planetary gears thereby reducing a rotation speed of the sun gear, and outputting the rotation with reduced speed to the rotating member, wherein an elastic member, which generates an elastic force in a circumferential direction in accordance with rotation of the ring gear relative to the housing, is provided between the ring gear and the housing, the elastic member is formed to be compressible in the circumferential direction in accordance with the rotation of the ring gear relative to the housing upon release of a parking brake operation and is formed to have a clearance equal to or more than zero (0) in the circumferential direction relative to the ring gear and the housing while in a process of the parking brake operation, the ring gear is formed to be insertable onto an inner peripheral surface of the housing;

the housing includes an accommodating surface, which extends from an outer wall of the housing in a radial direction toward the center of the ring gear and which faces an axially end surface of the ring gear located at a position opposite to the parking brake actuator;

the inner peripheral surface of the housing is formed with a lock-side torque receiver and a release-side torque receiver, which project in a radially inward direction toward an outer peripheral surface of the ring gear and which are distanced away from one another by a predetermined distance in the circumferential direction, and an engagement wall, which projects in the radially inward direction at a location other than an interval between the lock-side torque receiver and the release-side torque receiver and which extends in the circumferential direction at a location distanced away from the accommodating surface by a predetermined distance in an axial direction;

the outer peripheral surface of the ring gear is formed with a stopper portion, which projects in a radially outward direction and whose width in the circumferential direction is smaller than the interval between the lock-side torque receiver and the release-side torque receiver, and a detachment prevention portion, which projects in the radially outward direction at a location distanced away from the stopper portion in the circumferential direction and whose width in the axial direction is smaller than a clearance between the accommodating surface and the engagement wall; and the ring gear is attached to the housing in such a manner that the ring gear is inserted relative to the housing in the axial direction while the stopper portion is located at a position between the lock-side torque receiver and the release-side torque receiver in the circumferential direction and the detachment prevention portion is located at a position avoiding the engagement wall in the circumferential direction, then, the ring gear is rotated in the circumferential direction so that the stopper portion is moved closer to the lock-side torque receiver until the stopper portion is positioned between the accommodating surface and the engagement wall, and thereafter the elastic member is inserted in the axial direction into a clearance formed between the stopper portion and the release-side torque receiver in the circumferential direction.

2. The electric parking brake driving device according to claim 1, wherein the elastic member includes a tightening allowance in an axial direction of the ring gear relative to the ring gear and the housing.

3. The electric parking brake driving device according to claim 1, wherein the elastic member includes a tightening allowance in a radial direction relative to the ring gear and the housing.

4. The electric parking brake driving device according to claim 1, wherein the outer peripheral surface of the ring gear is formed with a retaining portion projecting in the radially outward direction, the retaining portion faces an axially end portion of the elastic member, which does not face the accommodating surface, while the ring gear is attached on the housing, and the elastic member is insertable in the axial direction while passing over the retaining portion.

5. The electric parking brake driving device according to claim 1, wherein the reduction gear mechanism includes:

a drive gear provided within the housing and fixed on an output shaft of the electric motor;

a first rotating shaft rotatably supported relative to the housing;

a first driven gear formed on the first rotating shaft, having a greater number of teeth than the drive gear, and engaged with the drive gear, so that the rotation speed of the electric motor is reduced and the rotation with the reduced speed is transmitted to the first rotating shaft;

a transmitting gear provided on the first rotating shaft and rotating unitary with the first driven gear;

a second rotating shaft rotatably supported relative to the housing; and a second driven gear provided on the second rotating shaft, having a greater number of teeth than the transmitting gear, and engaged with the transmitting gear, wherein the sun gear is formed on the second rotating shaft so that the sun gear rotates unitary with the second driven gear.

* * * * *